(12) United States Patent
Dudding et al.

(10) Patent No.: US 9,242,524 B2
(45) Date of Patent: Jan. 26, 2016

(54) VEHICLE SUSPENSION

(71) Applicant: Hendrickson USA, L.L.C., Itasca, IL (US)

(72) Inventors: Ashley T. Dudding, Yorkville, IL (US); Richard J. Aumann, Bolingbrook, IL (US); Michael Brannigan, Narbeth, PA (US); Matthew J. Van Meter, Plainfield, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/803,622

(22) Filed: Jul. 20, 2015

(65) Prior Publication Data

US 2015/0321529 A1 Nov. 12, 2015

Related U.S. Application Data

(63) Continuation of application No. 14/201,528, filed on Mar. 7, 2014, now Pat. No. 9,085,212.

(60) Provisional application No. 61/794,018, filed on Mar. 15, 2013.

(51) Int. Cl.
*B60G 11/27* (2006.01)
*B60G 9/02* (2006.01)

(52) U.S. Cl.
CPC ............... *B60G 11/27* (2013.01); *B60G 9/02* (2013.01); *B60G 2200/341* (2013.01); *B60G 2200/464* (2013.01); *B60G 2204/4306* (2013.01)

(58) Field of Classification Search
CPC .... B60G 11/27; B60G 9/02; B60G 2200/464; B60G 2204/4306; B60G 2200/341
USPC ............ 280/124.116, 124.128, 124.153, 280/124.154, 124.134, 124.145
See application file for complete search history.

(56) References Cited

U.S. PATENT DOCUMENTS

| 7,706 | A | * | 10/1850 | Ray | ............... | A01H 5/02 139/345 |
| 1,409,044 | A | * | 3/1922 | Tusar | ............... | E01B 9/36 238/298 |

(Continued)

FOREIGN PATENT DOCUMENTS

| CN | 200974446 | 11/2007 |
| CN | 301294475 | 7/2010 |

(Continued)

OTHER PUBLICATIONS

Hendrickson Truck Supension Systems, A Boler Company, Sales engineering update, Subject: Model Designation and Discontinuance, Aug. 1999.

(Continued)

*Primary Examiner* — Drew Brown
(74) *Attorney, Agent, or Firm* — McDonnell Boehnen Hulbert & Berghoff LLP.

(57) ABSTRACT

A suspension assembly having a frame hanger, a first control arm mounted between the frame hanger and an axle attachment member, a second control arm mounted to the frame hanger and to the axle attachment member, wherein the second arm extends from a centerline of the first control arm at an angle alpha such that the first control arm and the second control arm are not parallel to each other, wherein the centerline of the first control arm and the centerline of the second control arm extend to intersect at a point that is at a virtual center of rotation.

18 Claims, 13 Drawing Sheets

(56) References Cited

U.S. PATENT DOCUMENTS

| | | | | |
|---|---|---|---|---|
| 1,516,051 A * | 11/1924 | Lundie | E01B 9/36 238/298 |
| 1,576,376 A * | 3/1926 | Sudekum | F16J 15/186 24/706.6 |
| 1,604,961 A * | 11/1926 | Bell | E01B 9/686 238/290 |
| 1,608,507 A * | 11/1926 | Hogan | E01B 9/36 238/298 |
| 1,640,179 A * | 8/1927 | Buckwalter | B61F 3/08 105/182.1 |
| 1,640,204 A * | 8/1927 | Martini | E01B 7/14 246/389 |
| 1,679,528 A * | 8/1928 | Johanson | E01B 13/02 238/292 |
| 1,817,325 A * | 8/1931 | Sinkovich | E01B 9/44 238/304 |
| 1,853,166 A * | 4/1932 | Nibbe | E01B 9/36 238/298 |
| 1,949,363 A * | 2/1934 | Willard | E01B 9/36 238/298 |
| 1,974,160 A * | 9/1934 | Peirson | A44B 15/00 16/365 |
| 2,094,335 A * | 9/1937 | Willard | E01B 9/36 238/298 |
| 2,111,475 A * | 3/1938 | Kegresse | B62D 55/1086 280/681 |
| 2,197,727 A * | 4/1940 | Ledwinka | B61F 3/08 105/182.1 |
| 2,216,715 A * | 10/1940 | Ledwinka | B60G 11/22 105/208.1 |
| 2,245,296 A * | 6/1941 | Piron | F16F 1/3713 267/292 |
| 2,284,484 A * | 5/1942 | Eksergian | B61H 5/00 188/153 A |
| 2,286,563 A * | 6/1942 | Mussey | B61F 5/30 105/224.1 |
| 2,323,919 A * | 7/1943 | Knox | B62D 55/108 267/249 |
| 2,333,650 A * | 11/1943 | Hickman | B60K 17/36 267/276 |
| 2,437,158 A * | 3/1948 | Heiney | B60G 5/053 180/22 |
| 2,655,005 A * | 10/1953 | Kinneman | E02B 3/26 114/219 |
| 2,663,570 A * | 12/1953 | Hickman | B60G 5/043 267/257 |
| 2,689,136 A * | 9/1954 | Hendrickson | B60G 5/02 267/258 |
| 2,704,664 A * | 3/1955 | Hickman | B60G 11/22 267/294 |
| 2,706,113 A * | 4/1955 | Hickman | B60G 9/00 105/224.1 |
| 2,739,821 A * | 3/1956 | Hickman | B60G 5/04 267/292 |
| 2,750,200 A * | 6/1956 | Scheel | B60G 5/04 267/67 |
| 2,758,832 A * | 8/1956 | Hickman | B60G 11/22 267/294 |
| 2,775,353 A * | 12/1956 | Tillou | B61G 9/06 213/34 |
| 2,788,222 A * | 4/1957 | Wilson | B60G 5/047 188/106 R |
| 2,798,735 A * | 7/1957 | Compton | B60G 5/02 105/198.7 |
| 2,802,662 A * | 8/1957 | Hirst | B60G 11/22 105/224.05 |
| 2,872,207 A * | 2/1959 | Hirst | B60G 5/04 267/257 |
| 2,880,885 A * | 4/1959 | Willison | B61G 9/06 213/45 |
| 2,905,390 A * | 9/1959 | Saul | E01B 9/06 238/294 |
| 2,940,771 A * | 6/1960 | Hendrickson | B60G 5/02 267/67 |
| 2,980,439 A * | 4/1961 | Miller | B60G 5/04 267/292 |
| 2,981,208 A * | 4/1961 | Sinclair | B61F 5/32 105/198.7 |
| 2,995,383 A * | 8/1961 | Barker | B60G 11/22 267/292 |
| 3,004,715 A * | 10/1961 | Gadd | E01B 9/306 238/287 |
| 3,011,776 A * | 12/1961 | Reed | B60G 11/22 267/292 |
| 3,017,195 A * | 1/1962 | Hickman | B60G 5/02 280/124.178 |
| 3,030,098 A * | 4/1962 | Roubal | F16F 1/54 209/326 |
| 3,037,764 A * | 6/1962 | Paulsen | F16F 1/422 267/141 |
| 3,045,998 A * | 7/1962 | Hirst | B61F 5/142 105/199.3 |
| 3,047,163 A * | 7/1962 | Johnson | B61G 9/06 213/40 R |
| 3,071,422 A * | 1/1963 | Hinks | F16C 33/26 267/282 |
| 3,121,560 A * | 2/1964 | Reed | B60G 5/02 267/258 |
| 3,134,585 A * | 5/1964 | Trask | F16F 1/40 188/268 |
| 3,231,258 A * | 1/1966 | Brownyer | B60G 9/003 267/31 |
| 3,241,856 A * | 3/1966 | Raidel | B60G 5/04 267/257 |
| 3,276,395 A * | 10/1966 | Heintzel | B61F 5/305 105/224.1 |
| 3,279,779 A * | 10/1966 | Kloss | F16F 3/12 267/153 |
| 3,279,820 A * | 10/1966 | Hickman | B60G 11/22 267/153 |
| 3,297,339 A * | 1/1967 | Hendrickson | B60G 5/02 280/681 |
| 3,301,573 A * | 1/1967 | Hickman | B60G 5/04 267/292 |
| 3,305,227 A * | 2/1967 | Henley | F16F 1/422 16/44 |
| 3,315,951 A * | 4/1967 | Boschi | F16F 1/371 267/141 |
| 3,368,806 A * | 2/1968 | Szonn | F16F 1/422 267/153 |
| 3,436,155 A * | 4/1969 | Perin, Jr. | B23B 49/026 356/138 |
| 3,447,814 A * | 6/1969 | Keary | B60G 11/22 180/9.1 |
| 3,471,165 A * | 10/1969 | Raidel | B60G 5/04 267/257 |
| 3,482,852 A * | 12/1969 | Hickman | B60G 9/04 267/257 |
| 3,485,040 A * | 12/1969 | Niskanen | F01N 3/046 60/310 |
| 3,531,099 A * | 9/1970 | King | B60G 5/047 267/186 |
| 3,539,170 A * | 11/1970 | Hamel | B60G 11/22 105/198.7 |
| 3,545,787 A * | 12/1970 | Miller | B60G 5/06 280/687 |
| 3,563,525 A * | 2/1971 | Narabu | E02B 3/26 267/140 |
| 3,572,745 A * | 3/1971 | Willetts | B60G 11/22 267/248 |
| 3,575,403 A * | 4/1971 | Hamel | B61F 5/305 105/198.7 |
| 3,580,611 A * | 5/1971 | McNitt | B62D 3/0807 280/433 |
| 3,606,295 A * | 9/1971 | Appleton | B60G 11/22 105/198.7 |
| 3,618,533 A * | 11/1971 | Hirst | B61F 5/36 105/195 |
| 3,618,971 A * | 11/1971 | Wragg | B60G 11/22 267/279 |
| 3,625,501 A * | 12/1971 | Hein | B61G 7/10 213/20 |

(56) References Cited

U.S. PATENT DOCUMENTS

| | | | | |
|---|---|---|---|---|
| 3,626,465 A * | 12/1971 | Hirst | ............ | B60G 11/24 105/198.7 |
| 3,653,683 A * | 4/1972 | Hendrickson | ......... | B60G 11/62 267/256 |
| 3,687,477 A * | 8/1972 | Miller | ............ | B60G 7/00 280/681 |
| 3,695,737 A * | 10/1972 | Alexander | ......... | B62D 55/108 267/292 |
| 3,699,897 A * | 10/1972 | Sherrick | ......... | B61F 15/02 105/218.1 |
| 3,712,246 A * | 1/1973 | Lich | ............ | B61F 3/10 105/195 |
| 3,716,999 A * | 2/1973 | Middelbeek | ......... | E02B 3/26 114/219 |
| 3,730,549 A * | 5/1973 | Turner, Jr. | ......... | B60G 11/465 267/260 |
| 3,731,913 A * | 5/1973 | Hirst | ............ | B61F 5/305 267/294 |
| 3,792,871 A * | 2/1974 | Chalmers | ......... | B60G 5/04 267/292 |
| 3,797,851 A * | 3/1974 | Hirst | ............ | B60G 11/22 267/294 |
| 3,811,700 A * | 5/1974 | Moore | ............ | B60G 11/22 267/52 |
| 3,817,551 A * | 6/1974 | Moore | ............ | B60G 11/22 280/681 |
| 3,830,483 A * | 8/1974 | Gaydecki | ......... | F16F 1/40 105/224.1 |
| 3,831,923 A * | 8/1974 | Meldrum | ......... | F16F 1/422 267/141 |
| 3,857,556 A * | 12/1974 | Wing | ............ | F16F 1/403 105/224.1 |
| 3,936,073 A * | 2/1976 | Hickman | ......... | B60G 11/52 267/33 |
| 3,952,669 A * | 4/1976 | Mauzin | ......... | B61G 7/10 105/171 |
| 3,955,808 A * | 5/1976 | Jorn | ............ | B60G 15/08 105/113 |
| D240,239 S * | 6/1976 | Calandrino | ......... | D24/230 |
| 3,984,125 A * | 10/1976 | Paton | ............ | B60G 5/04 105/198.7 |
| 3,997,151 A * | 12/1976 | Leingang | ......... | F16F 1/406 267/140 |
| 3,999,497 A * | 12/1976 | Hamel | ......... | F16F 1/422 114/219 |
| D246,572 S * | 12/1977 | Walter | ......... | D15/140 |
| 4,082,316 A * | 4/1978 | Raidel | ............ | B60G 11/22 267/292 |
| 4,095,690 A * | 6/1978 | Baldwin | ......... | B65D 85/544 206/223 |
| 4,108,470 A * | 8/1978 | Vinton | ............ | B60G 5/02 280/677 |
| 4,111,131 A * | 9/1978 | Bullock | ............ | B61F 5/305 105/167 |
| 4,111,406 A * | 9/1978 | Zanow | ............ | B60G 11/22 267/153 |
| 4,132,433 A * | 1/1979 | Willetts | ......... | B60G 5/04 267/35 |
| 4,134,343 A * | 1/1979 | Jackson | ............ | B61F 3/08 105/167 |
| 4,144,978 A * | 3/1979 | Drake | ............ | B60G 9/02 280/124.109 |
| 4,162,799 A * | 7/1979 | Willetts | ......... | B60G 5/04 267/256 |
| 4,182,338 A * | 1/1980 | Stanulis | ......... | A61B 17/1325 606/203 |
| 4,193,612 A * | 3/1980 | Masser | ............ | B60G 11/23 267/293 |
| 4,213,633 A * | 7/1980 | Moore | ............ | B60G 7/04 267/258 |
| 4,256,327 A * | 3/1981 | Leinweber | ......... | B60G 11/183 280/124.116 |
| 4,258,629 A * | 3/1981 | Jackson | ......... | B61F 5/38 105/167 |
| 4,278,271 A * | 7/1981 | Raidel | ............ | B60G 9/003 267/219 |
| D265,285 S * | 7/1982 | Englert, Jr. | ......... | D8/354 |
| 4,358,096 A * | 11/1982 | Paton | ............ | B60G 15/04 188/129 |
| 4,371,189 A * | 2/1983 | Raidel | ............ | B60G 5/047 267/262 |
| 4,382,547 A * | 5/1983 | Phillips | ............ | E01B 9/10 238/281 |
| D270,574 S * | 9/1983 | Black | ............ | D25/68 |
| 4,420,171 A * | 12/1983 | Raidel | ............ | B60G 5/047 267/31 |
| 4,452,007 A * | 6/1984 | Martin | ............ | A63H 27/14 124/1 |
| D275,178 S * | 8/1984 | Yeater | ............ | D8/349 |
| 4,465,300 A * | 8/1984 | Raidel, Sr. | ............ | B60G 9/003 267/225 |
| 4,486,029 A * | 12/1984 | Raidel | ............ | B60G 5/047 267/46 |
| 4,488,495 A * | 12/1984 | Dean, II | ............ | B61F 5/305 105/182.1 |
| 4,504,080 A * | 3/1985 | VanDenberg | ......... | B62D 61/125 267/45 |
| 4,518,171 A * | 5/1985 | Hedenberg | ......... | B60G 9/00 280/124.104 |
| 4,527,365 A * | 7/1985 | Yoshizawa | ......... | F16F 7/08 267/154 |
| 4,548,150 A * | 10/1985 | Drewett | ............ | E02B 3/26 114/219 |
| 4,585,086 A * | 4/1986 | Hiramatsu | ......... | B62K 19/02 180/219 |
| 4,589,347 A * | 5/1986 | Colford | ............ | F16F 1/403 105/224.1 |
| 4,705,294 A * | 11/1987 | Raidel | ............ | B60G 5/047 267/31 |
| 4,733,855 A * | 3/1988 | Balczun | ............ | F16F 1/40 267/141.1 |
| 4,753,456 A * | 6/1988 | Booher | ............ | B29C 70/52 280/124.134 |
| 4,781,365 A * | 11/1988 | Harrison | ......... | B60G 7/04 248/634 |
| 4,793,597 A * | 12/1988 | Smith | ............ | B60G 11/52 248/634 |
| 4,802,690 A * | 2/1989 | Raidel | ............ | B60G 11/27 280/124.157 |
| D306,476 S * | 3/1990 | Millard | ......... | D22/123 |
| 4,944,402 A * | 7/1990 | Wu | ............ | A45D 33/20 132/287 |
| D312,205 S * | 11/1990 | de Rooij | ......... | 40/759 |
| 4,968,010 A * | 11/1990 | Odobasic | ............ | B60G 11/48 267/140.11 |
| 4,995,636 A * | 2/1991 | Hall | ............ | B60G 7/02 267/141 |
| 5,018,756 A * | 5/1991 | Mitchell | ............ | B60G 11/27 280/81.6 |
| D318,010 S * | 7/1991 | Clinkscales | ......... | D8/373 |
| 5,114,178 A * | 5/1992 | Baxter | ............ | B60G 9/003 267/292 |
| 5,118,086 A * | 6/1992 | Stevenson | ............ | F16F 1/371 267/141.1 |
| 5,150,657 A * | 9/1992 | Bourgeot | ............ | B61D 3/10 105/3 |
| 5,150,918 A * | 9/1992 | Heitzmann | ............ | B60G 11/22 267/257 |
| 5,230,528 A * | 7/1993 | Van Raden | ......... | B62D 61/12 280/124.116 |
| 5,237,933 A * | 8/1993 | Bucksbee | ............ | B61F 5/305 105/224.1 |
| D341,529 S * | 11/1993 | Jacobs | ......... | D25/119 |
| 5,271,678 A * | 12/1993 | Bourgeot | ............ | B61D 3/10 105/3 |
| D344,254 S * | 2/1994 | Zimmerman | ......... | 180/354 |
| 5,283,404 A * | 2/1994 | Prescaro, Jr. | ......... | B60R 21/2037 200/61.54 |
| D349,041 S * | 7/1994 | Wical | ......... | D11/164 |
| 5,327,674 A * | 7/1994 | Powell | ............ | A01M 23/10 43/4 |
| 5,333,897 A * | 8/1994 | Landis | ............ | B60R 21/2037 200/61.54 |

(56) References Cited

U.S. PATENT DOCUMENTS

| | | | | |
|---|---|---|---|---|
| 5,346,247 A * | 9/1994 | Snyder | B60G 11/465 | 267/31 |
| 5,364,086 A * | 11/1994 | Paton | B60G 11/465 | 248/562 |
| D356,641 S * | 3/1995 | Stewart | D24/176 | |
| 5,413,320 A * | 5/1995 | Herbst | F16F 13/24 | 248/562 |
| D360,544 S * | 7/1995 | Gauthier | D6/672 | |
| 5,447,324 A * | 9/1995 | Raidel, Sr. | B60G 5/04 | 280/676 |
| 5,465,997 A * | 11/1995 | Heitzmann | B60G 9/003 | 267/257 |
| 5,482,406 A * | 1/1996 | Arlt, III | E21B 19/006 | 166/167 |
| 5,505,482 A * | 4/1996 | VanDenberg | B60G 5/04 | 280/124.157 |
| 5,508,482 A * | 4/1996 | Martin | B60R 21/2037 | 200/61.54 |
| D377,961 S * | 2/1997 | Dickson | D22/122 | |
| 5,615,786 A * | 4/1997 | Hoyon | B61D 3/10 | 105/3 |
| 5,620,194 A * | 4/1997 | Keeler | B60G 11/27 | 280/81.6 |
| D381,338 S * | 7/1997 | Johansson | D14/253 | |
| 5,649,719 A * | 7/1997 | Wallace | B60G 7/02 | 180/352 |
| D384,877 S * | 10/1997 | Perrin | D8/354 | |
| 5,676,356 A * | 10/1997 | Ekonen | B60G 5/053 | 248/634 |
| D390,305 S * | 2/1998 | Dickson | D22/122 | |
| 5,718,445 A * | 2/1998 | VanDenberg | B60G 5/00 | 105/168 |
| D391,915 S * | 3/1998 | Miller | D12/223 | |
| 5,753,429 A * | 5/1998 | Pugh | B01L 3/508 | 435/14 |
| 5,785,345 A * | 7/1998 | Barlas | B60G 11/465 | 280/124.116 |
| D397,667 S * | 9/1998 | White | D12/223 | |
| 5,810,337 A * | 9/1998 | McLaughlin | B60G 7/04 | 267/140.4 |
| 5,868,384 A * | 2/1999 | Anderson | F16F 1/3732 | 267/140 |
| 5,882,031 A | 3/1999 | VanDenberg | | |
| 5,887,881 A * | 3/1999 | Hatch | B60G 11/107 | 267/269 |
| D409,077 S * | 5/1999 | Brooks | D8/354 | |
| 5,899,470 A * | 5/1999 | Heitzmann | B60G 7/02 | 267/257 |
| 5,909,821 A * | 6/1999 | Guridi | B65D 81/3886 | 220/592 |
| 5,924,712 A * | 7/1999 | Pierce | B60G 21/051 | 280/124.128 |
| 5,938,221 A * | 8/1999 | Wilson | B60G 11/10 | 267/260 |
| 5,947,458 A * | 9/1999 | Rhodes | B60G 17/0424 | 267/140.13 |
| 5,957,441 A * | 9/1999 | Tews | F16F 1/373 | 267/153 |
| D415,950 S * | 11/1999 | Anderson | D8/354 | |
| 5,989,075 A * | 11/1999 | Hsiao | H01R 13/41 | 439/444 |
| 6,008,460 A * | 12/1999 | Demari | H01H 13/7006 | 200/302.2 |
| 6,038,163 A * | 3/2000 | Clemens | G11C 11/412 | 365/149 |
| D423,342 S * | 4/2000 | Popesco | D21/505 | |
| 6,045,328 A * | 4/2000 | Jones | F16F 13/105 | 248/562 |
| 6,092,819 A * | 7/2000 | Overby | B60G 3/185 | 280/124.153 |
| 6,129,369 A * | 10/2000 | Dudding | B60G 11/12 | 267/270 |
| 6,135,470 A * | 10/2000 | Dudding | B60G 11/28 | 280/124.128 |
| 6,158,750 A * | 12/2000 | Gideon | B60G 7/02 | 267/281 |
| 6,176,345 B1 * | 1/2001 | Perkins | H04R 7/00 | 181/171 |
| 6,178,894 B1 * | 1/2001 | Leingang | B61F 5/305 | 105/218.1 |
| 6,189,904 B1 * | 2/2001 | Gentry | B60G 11/08 | 267/149 |
| 6,193,266 B1 * | 2/2001 | Cortez | B60G 5/02 | 280/677 |
| 6,195,266 B1 * | 2/2001 | Padgett | H05K 7/1431 | 174/354 |
| 6,206,407 B1 * | 3/2001 | Fuchs | B60G 5/00 | 280/124.174 |
| 6,209,896 B1 * | 4/2001 | Hickling | B60G 9/00 | 280/124.169 |
| 6,264,231 B1 * | 7/2001 | Scully | B60G 5/047 | 248/228.1 |
| 6,276,674 B1 * | 8/2001 | Randell | F16F 1/3713 | 267/140.13 |
| 6,328,294 B1 * | 12/2001 | Palinkas | F16F 3/087 | 267/140.3 |
| 6,328,322 B1 * | 12/2001 | Pierce | B60G 7/001 | 280/124.131 |
| 6,390,485 B1 * | 5/2002 | Cadden | B60G 11/44 | 280/124.1 |
| 6,398,236 B1 * | 6/2002 | Richardson | B60G 11/30 | 280/124.157 |
| 6,439,588 B1 * | 8/2002 | Svensson | B60G 5/04 | 180/352 |
| 6,478,321 B1 * | 11/2002 | Heitzmann | B60G 5/047 | 267/219 |
| 6,516,914 B1 * | 2/2003 | Andersen | B60G 3/20 | 180/312 |
| D471,888 S * | 3/2003 | Solland | D14/204 | |
| 6,527,286 B2 * | 3/2003 | Keeler | B60G 7/001 | 280/124.135 |
| D474,274 S * | 5/2003 | Walters | D24/128 | |
| 6,572,087 B2 * | 6/2003 | Schleinitz | F16F 1/126 | 267/140.12 |
| 6,588,820 B2 * | 7/2003 | Rice | B60G 99/004 | 248/635 |
| D479,793 S * | 9/2003 | Jones | D8/349 | |
| 6,659,438 B2 * | 12/2003 | Michael | F16F 1/406 | 267/153 |
| 6,666,474 B2 * | 12/2003 | Pavuk | B60G 5/00 | 280/124.106 |
| 6,702,240 B1 * | 3/2004 | Bradley | B23D 59/007 | 248/176.1 |
| D496,887 S * | 10/2004 | Carlson | D12/159 | |
| 6,817,301 B1 * | 11/2004 | Bullock | B61F 5/06 | 105/182.1 |
| 6,834,873 B1 * | 12/2004 | Vander Kooi | B60G 9/022 | 280/124.107 |
| D503,231 S * | 3/2005 | Daugherty | D24/128 | |
| 6,877,623 B2 * | 4/2005 | Salis | F16F 3/12 | 213/40 R |
| D507,658 S * | 7/2005 | Wescott, III | 422/412 | |
| 6,916,037 B2 * | 7/2005 | Baxter | B60G 5/00 | 280/124.104 |
| 6,951,260 B1 * | 10/2005 | Isley | B60G 5/02 | 180/9.54 |
| D515,942 S * | 2/2006 | Hamblin | D24/230 | |
| D515,943 S * | 2/2006 | Hamblin | D24/230 | |
| D519,104 S * | 4/2006 | Richter | D14/207 | |
| D520,322 S * | 5/2006 | Orlando | D8/354 | |
| 7,059,631 B2 * | 6/2006 | Schorle | B60R 21/2037 | 280/728.2 |
| 7,077,411 B2 * | 7/2006 | Peters | B60G 5/02 | 280/124.132 |
| D530,187 S * | 10/2006 | Esbaugh | D8/354 | |
| 7,168,718 B2 * | 1/2007 | Svartz | B60G 9/025 | 280/124.13 |
| 7,185,903 B2 * | 3/2007 | Dove | B60G 3/20 | 280/124.141 |
| D543,492 S * | 5/2007 | Lyew | D12/159 | |
| 7,229,088 B2 * | 6/2007 | Dudding | B60G 7/04 | 280/124.17 |
| 7,234,723 B2 | 6/2007 | Sellers | | |

(56) References Cited

U.S. PATENT DOCUMENTS

| | | | | |
|---|---|---|---|---|
| D551,315 S * | 9/2007 | Zimmerman | | D22/119 |
| 7,287,760 B1 * | 10/2007 | Quick | | B60G 17/08 280/5.507 |
| 7,293,794 B2 * | 11/2007 | Clarke | | B60R 21/2035 280/731 |
| 7,303,200 B2 * | 12/2007 | Ramsey | | B62D 21/02 280/124.109 |
| D559,081 S * | 1/2008 | Myers | | D8/354 |
| 7,320,538 B2 * | 1/2008 | Ko | | G02B 5/045 362/339 |
| 7,331,588 B2 * | 2/2008 | Johnson | | B60G 9/00 280/124.116 |
| 7,387,074 B2 * | 6/2008 | Myers | | B61F 5/32 105/220 |
| D582,918 S * | 12/2008 | Scott | | D14/432 |
| D586,204 S * | 2/2009 | Robbins, III | | D8/380 |
| 7,490,852 B2 * | 2/2009 | Marotzke | | B60Q 5/003 280/731 |
| 7,500,687 B2 * | 3/2009 | Dare-Bryan | | B60G 3/20 280/124.109 |
| 7,607,668 B2 * | 10/2009 | Dugandzic | | B60G 13/003 280/124.147 |
| D603,303 S * | 11/2009 | Noble | | D12/160 |
| D604,792 S * | 11/2009 | Stanley | | D22/108 |
| D605,984 S * | 12/2009 | Noble | | D12/159 |
| D606,459 S * | 12/2009 | Noble | | D12/159 |
| D610,952 S * | 3/2010 | Noble | | D12/159 |
| D615,005 S * | 5/2010 | Noble | | D12/159 |
| 7,708,309 B2 * | 5/2010 | Kim | | B60R 21/217 280/731 |
| 7,748,726 B2 * | 7/2010 | Dudding | | B60G 7/001 280/124.116 |
| D622,642 S * | 8/2010 | Noble | | D12/160 |
| D624,461 S * | 9/2010 | Noble | | D12/159 |
| D624,462 S * | 9/2010 | Noble | | D12/159 |
| D624,463 S * | 9/2010 | Noble | | D12/159 |
| D624,464 S * | 9/2010 | Noble | | D12/159 |
| D624,465 S * | 9/2010 | Noble | | D12/159 |
| 7,832,508 B2 | 11/2010 | Isley | | |
| 7,845,288 B2 * | 12/2010 | Forbes | | B61F 5/122 105/223 |
| D630,137 S * | 1/2011 | Noble | | D12/160 |
| D632,230 S * | 2/2011 | Noble | | D12/160 |
| D632,619 S * | 2/2011 | Noble | | D12/160 |
| D632,620 S * | 2/2011 | Noble | | D12/160 |
| D633,011 S * | 2/2011 | Noble | | D12/159 |
| 7,926,836 B2 | 4/2011 | Noble et al. | | |
| D645,794 S * | 9/2011 | Noble | | D12/159 |
| 8,033,565 B2 * | 10/2011 | Holroyd | | B60G 5/053 280/124.116 |
| D648,031 S * | 11/2011 | Roggenkamp | | D24/184 |
| D648,249 S * | 11/2011 | Noble | | D12/159 |
| 8,052,166 B2 | 11/2011 | Noble et al. | | |
| 8,061,698 B2 * | 11/2011 | Palinkas | | F16F 1/373 105/199.1 |
| D649,917 S * | 12/2011 | Noble | | D12/159 |
| D650,082 S * | 12/2011 | Roggenkamp | | D24/184 |
| D650,483 S * | 12/2011 | Roggenkamp | | D24/184 |
| 8,070,143 B2 * | 12/2011 | Wietharn | | B60G 11/22 248/632 |
| D655,419 S * | 3/2012 | Roggenkamp | | D24/184 |
| 8,152,195 B2 | 4/2012 | Noble et al. | | |
| 8,192,106 B2 * | 6/2012 | Vogler | | F16F 1/3842 267/293 |
| 8,210,507 B2 * | 7/2012 | Mitsch | | F16F 1/40 267/140.4 |
| 8,262,112 B1 * | 9/2012 | Noble | | B60G 5/02 267/141.1 |
| 8,302,988 B2 | 11/2012 | Noble et al. | | |
| D672,286 S * | 12/2012 | Noble | | D12/159 |
| D672,287 S * | 12/2012 | Noble | | D12/159 |
| 2002/0117816 A1 * | 8/2002 | Dudding | | B60G 9/00 280/6.151 |
| 2002/0163165 A1 * | 11/2002 | Adema | | B60G 5/02 280/682 |
| 2003/0047907 A1 * | 3/2003 | Hicks | | B60G 7/02 280/438.1 |
| 2003/0196648 A1 * | 10/2003 | Schroer | | B28D 1/045 125/13.01 |
| 2004/0150142 A1 * | 8/2004 | Warinner | | B60G 11/64 267/3 |
| 2004/0262877 A1 * | 12/2004 | Sellers | | B60G 9/00 280/124.165 |
| 2005/0110233 A1 * | 5/2005 | Hedenberg | | B60G 9/003 280/124.11 |
| 2005/0189736 A1 * | 9/2005 | Svartz | | B60G 7/02 280/124.128 |
| 2005/0280238 A1 * | 12/2005 | Keeler | | B60G 7/001 280/124.116 |
| 2006/0071441 A1 * | 4/2006 | Mathis | | B60G 7/001 280/124.128 |
| 2006/0180967 A1 * | 8/2006 | Adema | | F16F 1/28 267/280 |
| 2006/0208445 A1 * | 9/2006 | Gideon | | B60G 9/022 280/124.116 |
| 2007/0262547 A1 * | 11/2007 | Warinner | | B60G 9/003 280/124.17 |
| 2008/0018070 A1 * | 1/2008 | Gottschalk | | B60G 9/003 280/86.5 |
| 2008/0030006 A1 | 2/2008 | Sellers | | |
| 2008/0122146 A1 * | 5/2008 | Herntier | | B62D 25/088 267/2 |
| 2008/0134413 A1 * | 6/2008 | Guo | | A42B 1/24 2/171.02 |
| 2008/0258361 A1 * | 10/2008 | Wen | | B60G 9/003 267/52 |
| 2008/0290572 A1 * | 11/2008 | Desprez | | F16F 1/126 267/178 |
| 2009/0008846 A1 * | 1/2009 | Yamakawa | | B60G 3/202 267/170 |
| 2009/0108086 A1 * | 4/2009 | Mospan | | E01B 9/40 238/287 |
| 2009/0218740 A1 * | 9/2009 | Gedenk | | B61F 5/305 267/294 |
| 2009/0224504 A1 * | 9/2009 | Noble | | B60G 5/02 280/124.178 |
| 2009/0224513 A1 * | 9/2009 | Noble | | B60G 5/02 280/681 |
| 2009/0230650 A1 * | 9/2009 | Mayen | | B60G 3/20 280/124.1 |
| 2010/0044992 A1 * | 2/2010 | Noble | | B60G 5/02 280/124.178 |
| 2010/0072733 A1 * | 3/2010 | Levi | | B60G 5/02 280/682 |
| 2010/0270719 A1 * | 10/2010 | Ranum | | B60G 5/053 267/294 |
| 2011/0031662 A1 * | 2/2011 | Toyama | | B61F 5/02 267/121 |
| 2011/0057407 A1 * | 3/2011 | Noble | | F16F 1/373 280/124.1 |
| 2011/0115184 A1 * | 5/2011 | Johnson | | B60G 9/022 280/124.111 |
| 2011/0175314 A1 * | 7/2011 | Ohra-aho | | B60G 9/003 280/124.106 |
| 2012/0001373 A1 * | 1/2012 | McLaughlin | | F16F 1/403 267/141.1 |
| 2012/0018983 A1 * | 1/2012 | Oriet | | B60G 5/02 280/676 |
| 2012/0325107 A1 * | 12/2012 | Wicks | | B61D 3/184 105/215.2 |
| 2013/0009377 A1 * | 1/2013 | Noble | | B60G 5/02 280/124.178 |
| 2013/0019774 A1 * | 1/2013 | Ahuja | | B61C 9/50 105/133 |
| 2013/0033018 A1 * | 2/2013 | Kiselis | | B60G 9/00 280/124.116 |
| 2013/0069333 A1 * | 3/2013 | Pizzeta | | B60G 5/03 280/124.116 |

(56) References Cited

U.S. PATENT DOCUMENTS

2013/0162007 A1* 6/2013 Oriet .................... B60B 35/009
 301/36.1

FOREIGN PATENT DOCUMENTS

| | | |
|---|---|---|
| CN | 301364969 | 10/2010 |
| DE | 973418 | 2/1960 |
| DE | 1959496 | 6/1971 |
| DE | 3524916 | 1/1987 |
| DE | 4128488 | 3/1993 |
| DE | 4204783 | 8/1993 |
| DE | 4338651 | 3/1995 |
| DE | 4334369 | 4/1995 |
| EP | 0419057 | 3/1991 |
| EP | 1911661 | 4/2008 |
| EP | 2006129 | 12/2008 |
| EP | 1 893 428 | 11/2011 |
| FR | 2270487 | 12/1975 |
| FR | 2342193 | 9/1977 |
| FR | 2550918 | 3/1985 |
| FR | 2797432 | 2/2001 |
| GB | 997305 | 7/1965 |
| GB | 2069424 | 8/1981 |
| GB | 2128942 | 5/1984 |
| GB | 2226867 | 7/1990 |
| GB | 2252276 | 8/1992 |
| GB | 2339264 | 1/2000 |
| GB | 2352016 | 1/2001 |
| JP | 57-128503 | 5/1982 |
| JP | 58-079408 | 5/1983 |
| JP | 59-073648 | 5/1984 |
| JP | 64-035134 | 2/1989 |
| JP | 05149035 | 6/1993 |
| JP | 05338552 | 12/1993 |
| JP | 08-156551 | 6/1996 |
| JP | H11-51116 | 2/1999 |
| JP | 11-059154 | 3/1999 |
| JP | 2000233621 | 8/2000 |
| JP | D1337440 | 8/2008 |
| TW | 528545 | 4/2003 |
| WO | 92/15800 | 9/1992 |
| WO | 02/42097 | 5/2002 |
| WO | 2006/067551 | 6/2006 |
| WO | 2010/068319 | 6/2010 |

OTHER PUBLICATIONS

Hendrickson Truck Supension Systems, A Boler Company, Sales engineering update, Subject: Equalizer Beam, Aug. 1999.
Hendrickson Truck Suspension Systems, A Boler Company, HN 402, Feb. 1996.
Hendrickson Truck Suspension Systems, A Boler Company, HN Series VariRate Spring System, May 1997.
Hendrickson Truck Suspension Systems, A Boler Company, HN Series VariRate Spring System, Nov. 1997.
Hendrickson Truck Suspension Systems, A Boler Company, HN Series VariRate Spring System, Sep. 1998.
Hendrickson Truck Suspension Systems, A Boler Company, HN Series VariRate Spring System, Jul. 1999.
Hendrickson Truck Suspension Systems, A Boler Company, R Series Solid Mount, Jul. 1999.
Hendrickson Truck Suspension Systems, A Boler Company, RS Series Rubber Load Cushion, Dec. 1996.
Hendrickson Truck Suspension Systems, A Boler Company, RS Series Rubber Load Cushion, Apr. 1998.
Hendrickson Truck Suspension Systems, A Boler Company, RS Series Rubber Load Cushion, Jun. 1999.
Hendrickson Truck Suspension Systems, A Boler Company, Technical Publication RS-340 thru 520, Subject: Springing: Frame Hangers, Load Cushions and Saddle Assembly, Jul. 1993.
Hendrickson Truck Suspension Systems, A Boler Company, Technical Publication HN Series Truck & Trailer Suspension No. 17730-198, Mar. 1993.
Hendrickson Truck Suspension Systems, A Boler Company, Technical Publication HN 402 Series, Subject: Service Instructions, Aug. 1996.
Hendrickson Truck Suspension Systems, A Boler Company, Technical Publication HN 402/462 Series, Subject: Service Instructions, Aug. 1998.
Hendrickson USA, L.L.C., Technical Procedure R/RS/RT Heavy Duty, Lit. No. 17730-149, Revision C, Jul. 2006.
Hendrickson, A Boler Company, Hendrickson Frame Hanger Selection Guide, May 1990.
Hendrickson, A Boler Company, Hendrickson RS Series, Single Axle Suspension, Sep. 1995.
Hendrickson, A Boler Company, HN Series Technical Sales Publication, Jun. 1997.
Hendrickson, A Boler Company, RS Series Rubber Load Cushion Suspensions, Mar. 1996.
Hendrickson, A Boler Company, RS Series Rubber Load Cushion Suspensions, Jul. 1996.
Hendrickson, A Boler Company, RS Series Rubber Load Cushion, Mar. 1998.
Hendrickson, Assembly Instructions Haulmaax Saddle Assembly, Subject: Service Kit No. 57974-048, Dec. 2008.
Hendrickson, Assembly Instructions Haulmaax, Subject: Outboard Frame Bracket for Paccar Vehicles Built after May 1, 2005 through Aug. 31, 2006, Oct. 2006.
Hendrickson USA, L.L.C., HUV, Lightweight Design, Premium Ride and Performance, Outstanding Durability, Nov. 2010.
Hendrickson, Assembly Instructions Haulmaax, Subject: Kit Nos. 64178-003 & 004, Feb. 2003.
Hendrickson, Assembly Instructions Haulmaax, Subject: Tie-bar Bolster Spring Kit Nos. 64179-037, Jun. 2006.
Hendrickson, Haulmaax Heavy Duty Suspension, Dec. 2003.
Hendrickson, Haulmaax Heavy Duty Suspension, Jan. 2007.
Hendrickson, Haulmaax Heavy Duty Suspension, Mar. 2005.
Hendrickson, Haulmaax Heavy Duty Suspension, Mar. 2008.
Hendrickson, Haulmaax Heavy Duty Suspension, Oct. 2001.
Hendrickson, HN Series VariRate Spring System, Nov. 2000.
Hendrickson, HN Series VariRate Spring System, Nov. 2005.
Hendrickson, Parts List Haulmaax, Dec. 2007.
Hendrickson, Parts List Haulmaax, Jul. 2003.
Hendrickson, Parts List Haulmaax, Jul. 2006.
Hendrickson, Parts List Haulmaax, May 2002.
Hendrickson, Parts List HN 402/462, Sep. 1997.
Hendrickson, Parts List HN Series, Dec. 2004.
Hendrickson, Parts List RS 400/460/480/520 Jan. 1998.
Hendrickson, Parts List RS Series, Apr. 2008.
Hendrickson, Parts List RS Series, Nov. 2004.
Hendrickson, RS Series Rubber Load Cushion, Feb. 2000.
Hendrickson, RS Series Rubber Load Cushion, Only Hendrickson makes choosing a heavy-duty suspension this easy, Jun. 1993.
Hendrickson, Technical Bulletin Haulmaax 460, Subject: Bolster Spring Assembly with Tie-bar, Jun. 2006.
Hendrickson, Technical Bulletin Haulmaax Series, Subject: Mandatory Shock Applications, Nov. 2004.
Hendrickson, Technical Bulletin Haulmaax, Subject: 54" Equalizing Beam Assembly, Oct. 2005.
Hendrickson, Technical Bulletin HN 402/462/522, Subject: Auxiliary Spring Shim Design, Oct. 2000.
Hendrickson, Technical Bulletin HN 402/462/522, Subject: Auxiliary Spring Shim Design, Dec. 2000.
U.S. Appl. No. 13/178,773, filed Jul. 8, 2011, pp. 1-99.
U.S. Appl. No. 29/315,182, filed Jun. 2, 2009, pp. 1-16.
U.S. Appl. No. 29/369,285, filed Sep. 5, 2010, pp. 1-65.
U.S. Appl. No. 29/369,287, filed Sep. 5, 2010, pp. 1-7.
U.S. Appl. No. 29/396,890, filed Jul. 8, 2011, pp. 1-20.
U.S. Appl. No. 29/396,892, filed Jul. 8, 2011, pp. 1-11.
U.S. Appl. No. 29/396,893, filed Jul. 8, 2011, pp. 1-19.
About.com, Progressive Rate Spring, downloaded from the World Wide Web at http://autorepair.about.com/library/glossary/bldef-277.htm on Nov. 21, 2008.
Answers.com-tie plate. http://www.answers.com/topic/tie-plate. Downloaded from the World Wide Web on Jul. 28, 2009.

(56) References Cited

OTHER PUBLICATIONS

Elastomer, downloaded from the World Wide Web at http://en.wikipedia.org/wiki/Elastomer on Nov. 24, 2008.
European Patent Office, Communication Relating to the Results of the Partial International Search, PCT/US2009/036662, Mar. 2, 2010.
European Patent Office, International Search Report for International Application No. PCT/US2009/036662, Feb. 17, 2010.
European Patent Office, International Search Report for International application No. PCT/US2009/056575, Mar. 3, 2010.
European Patent Office, Written Opinion for International application No. PCT/US2009/056575, Mar. 3, 2010.
European Patent Office, Written Opinion of the International Searching Authority for International Application No. PCT/US2009/036662, Feb. 17, 2010.
Hendrickson USA, L.L.C., Technical Procedure HUV 270t Heavy-duty Rubber Suspension, Subject: Service Instructions, Lit. No. 17730-269, Revision C, Feb. 2010.
Hendrickson, Haulmaxx Heavy-Duty Suspension, Jan. 2009.
Hendrickson, HN FR Series, HN FR Suspension 42-58K Fire/Rescue, Feb. 2009.
Hendrickson Mfg. Co., Tandem Division, Hendrickson Tandem Suspensions for GMC Trucks, Aug. 1979.
Hendrickson Mfg., Tandem Division, Wide spread equalizing beams, sales bulletin, May 1981.
European Patent Office, International Preliminary Report on Patentability for International Application No. PCT/US2009/056575, Mar. 29, 2011.
Hendrickson Suspension, A Boler Company, Hendrickson HNT Series, Feb. 1992.
Hendrickson Suspension, HN Series Premium Rubber, Hendrickson introduces a completely new concept in Walking Beam Suspension, Jun. 1993.
Hendrickson Suspension, RS Series rubber load cushion, Jul. 1991.
Hendrickson Suspension, Sales Engineering Update, Mar. 1993.
Hendrickson Technical Brochure for "Bus Air Ride Suspensions" H621 Oct. 1998.
Hendrickson Technical Brochure for "Non-Steerable Suspension Systems" H621 Dec. 2003.
Hendrickson Truck Supension Systems, A Boler Company, Sales engineering update, Subject: HN-402/462 Auxiliary Spring Assembly, Aug. 1998.
Hendrickson, Technical Bulletin HN 402/462/522, Subject: Auxiliary Spring Shim Design, Jun. 2006.
Hendrickson, Technical Bulletin R, RS, RT/RTE 46K Capacity, Subject: 46K Heavy-Duty Beam Option, Dec. 2004.
Hendrickson, Technical Procedure Haulmaax, Subject: Pre-delivery Inspection and Preventive Maintenance, Apr. 2006.
Hendrickson, Technical Procedure Haulmaax, Subject: Service Instructions, May 2002.
Hendrickson, Technical Procedure Haulmaax, Subject: Service Instructions, Jun. 2007.
Hendrickson, Technical Procedure Haulmaax, Subject: Service Instructions, Dec. 2007.
Hendrickson, Technical Procedure HN/HNT-400/460 Truck & Trailer Suspension in Production Nov. 1988-Sep. 1996, Apr. 1998.
Hendrickson, Technical Procedure, R/RS Heavy Duty, Subject: 85K/100K/120K lbs Capacity Tightening Torgue for Torque Rod and Saddle Assembly Fasteners, Oct. 2008.
Hendrickson USA, L.L.C., HUV Heavy-duty Rubber Suspension, Dec. 2009.
Hendrickson, The Boler Company, RS Frame Hanger, Dec. 1997.
"Hydropneumatic Suspension"—Wikipedia, the free encyclopedia, downloaded from the World Wide Web at http://en.wikipedia.org/wiki/hydropneumatic_suspension on Nov. 11, 2009.
Jorn, Technology in Rubber—Metal, Sep. 29, 2008.
Kenworth Truck Company, Haulmaxx, May 14, 2009.
Mor/ryde, A rubber spring . . . heart of the Mor/ryde system, Aug. 1973.
Mor/Ryde, Commercial Trailer Suspension, Jun. 1973.
Mor/Ryde, Company Profile, downloaded from the World Wide Web at http://www.morrydede.com/php/about/profile/php on Feb. 28, 2008.
Mor/Ryde, RL Rubber Leaf Suspension System, Owner's Manual, Mar. 12, 2003.
Mor/Ryde, School Bus Suspension, Aug. 1973.
Mor/Ryde, T/A Modular Rubber Suspension System, Service Manual, Mar. 5, 2003.
Mor/Ryde, Tandem Axle Rubber Suspension Sytem, Service Manual, Suspension Codes: T01-01 and L01-01, Mar. 5, 2003.
Mor/Ryde, The MOR/ryde Steer and Drive Axle Suspension Systems, Mar. 7, 2008.
Paul Macioce, Rouch Industrisies, Inc., Viscoelastic Damping 101, Sep. 9, 2002.
"Progressive Springs-Linear Springs," downloaded from the World Wide Web at http://www.scoobytuner.com/tuning/? tSfID1=1X6&tuningID=21 on Nov. 11, 2009.
"PT-Tuning," downloaded from the World Wide Web at http://autorepair.about.com/library/glossary/bldef-227.htm?p=1 on Nov. 11, 2009.
Wikipedia—File:Tie Plates.jpg. http://en.wikipedia.org/wiki/File:Tie_plates.jpg Downloaded from the World Wide Web Jul. 28, 2009.
Wikipedia—Tie plate. http://en.wikipedia.org/wiki/Tie_plate. Downloaded from the World Wide Web on Jul. 28, 2009.
Taiwan Search Report for TW Design Patent App. No. 100301028 dated Nov. 25, 2011.
Taiwan Search Report for TW Design Patent App. No. 100301032 dated Nov. 25, 2011.
Taiwan Search Report for TW Design Patent App. No. 100301033 dated Nov. 25, 2011.
International Searching Authority, International Search Report for PCT/US2011/049829 mailed Oct. 17, 2011, 4 pages.
International Searching Authority, International Search Report for PCT/US2012/045770, mailed Nov. 9, 2012, 12 pages.
Notice of Allowance for U.S. Appl. No. 29/369,287 mailed Mar. 1, 2012, 35 pages.
International Searching Authority, International Search Report and Written Opinion for PCT/US2014/046954 mailed Oct. 29, 2014, 13 pages.
Hendrickson, Hendrickson suspensions available on Spartan chassis, www.hendrickson-intl.com, 45745-301, 2007, 2 pages.
Hendrickson, HAS Series, Single-axle Air Suspension, www.hendrickson-intl.com, 45745-080 Rev D, 2008, 2 pages.
Hendrickson, Technical Bulletin, Primaax EX Firemaax Ex/Primaax Firemaax Series, Pivot Bushing and D-Pin Bushing Inspection, Lit No. SEU-0235, May 2012, Revision A, 4 pages.
Hendrickson, Technical Procedure, Primaax EX Firemaax Ex/Primaax Firemaax Series, Service Instructions, Lit. No. 17730-238, May 2012, Revision D, 104 pages.
Hendrickson, Technical Procedure Comfort Air, Service Instructions, 17730-236, Dec. 2007, Rev. B, 36 pages.
Hendrickson, Comfort Air Single Air Suspension, www.hendrickson-intl.com, 45745-173 Rev. C, 2010, 4 pages.
Hendrickson, Primaax EX Freightliner Vendor Components, 45745-228 Rev. C, 2010, 2 pages.
International Searching Authority, International Search Report and Written Opinion for PCT/US2014/026533 mailed Jul. 3, 2014, 20 pages.
Kenworth, Air Suspensions, Example of pre-Mar. 2013 suspension, 8 pages.
Neway, Neway Ad Series, Drive-Axle Air Suspension, www.safholland.com, XL-PS10448SL-en-US Rev A, 2012, 8 pages.
Neway, Severe-Duty Solutions for Trucks, Tractors and Trailers, www.safholland.com, XL-MP10006SL-en-US Rev A, 2014, 10 pages.
Neway, Neway ADZ Series Heavy-Duty Drive Axle Air Suspension, www.safholland.com, XL-PS10450SL-en-US Rev C, 2014, 8 pages.
Meritor RHP Ride Sentry MPA series, pre-2013, 1 page.

* cited by examiner

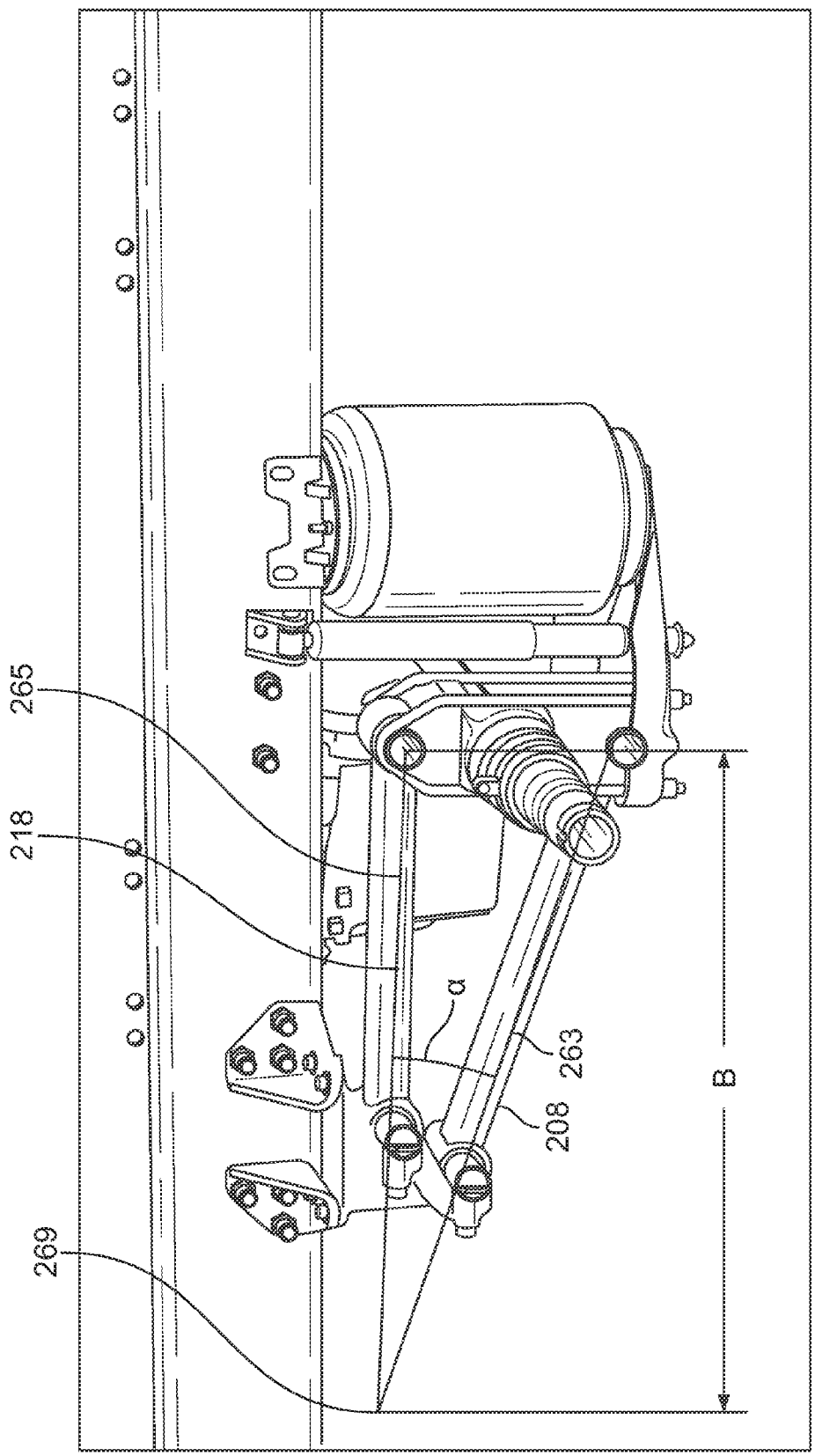

VEHICLE SUSPENSION

RELATED APPLICATION

This application is a continuation of and claims priority to U.S. patent application Ser. No. 14/201,528 filed Mar. 7, 2014, and claims priority to U.S. Provisional Patent Application 61/794,018 filed Mar. 15, 2013, both of which are incorporated by reference.

BACKGROUND

The present application generally relates to innovations and improvements in vehicle suspensions. More particularly, the present application relates to a linkage system that may be used in a vehicle suspension, and may be useful in multiple axle (i.e., tandem or tridem) on-off highway truck applications, or be applied to a single axle, such as a 4×2 commercial vehicle.

A typical trailing arm or trailing beam style air suspension achieves its primary roll stiffness property from the springing medium that reacts the vertical load and provides a vertical spring rate that will resist body roll. The spring rate developed by the air springs used in the suspension is low, however, when compared to a suspension using a mechanical spring. Consequently, additional roll stiffness has typically been required to be added to the air suspension to provide the desired overall roll stability characteristics.

As an example, on North American trailing arm suspensions, the rigid attachment of the arm to the axle together with the axle's torsional stiffness develops auxiliary roll stiffness. Essentially, a single wheel input on one side of the axle will move the axle along an arced path, the radius of the arc being a function of the length and pivot point of the trailing arm or beam. This motion will cause a relative angular change between one axle end and the other—resulting in a torsional load path through the axle. The section properties of the axle and its resultant resistance to torsional input will influence the auxiliary roll stiffness developed. The vertical stiffness of the front limb of the trailing arm (that portion of the arm that is forward of the axle) will also greatly impact the overall roll stiffness of the suspension.

As another example, on typical linkage air suspensions in Europe an "anti-roll bar" or "sway bar" has been utilized as the mechanism to achieve auxiliary roll stiffness. In the Hendrickson HTB suspension design embodied in U.S. Pat. No. 6,527,286, the auxiliary roll stiffness is achieved by the use of a torsionally stiff torque box (40) that is attached between the frame (via a cross member assembly) and the axle. The axle and control rods are attached by rubber bushed pivot connections and the axle undergoes minimal torsion or "twist" during axle cross articulation or opposed vertical travel side to side.

It would be desirable to provide a vehicle suspension wherein auxiliary roll stiffness is achieved without the addition of a roll-resisting device such as a torque box, or without the addition of an "anti-roll bar" or "sway bar." Moreover, typical suspensions that twist the axle are highly torque reactive. Therefore it would be desirable to provide a vehicle suspension that is non-torque reactive, meaning that it is generally free of significant axle wind-up or torque.

SUMMARY

In one aspect, a suspension assembly for supporting a longitudinally extending vehicle frame rail is provided having a frame hanger having a frame attachment portion adapted for mounting to the vehicle frame rail, an axle attachment member mounted to a first vehicle axle, first control arm having a first end mounted to, and extending from, a first frame hanger boss positioned on the frame hanger, and a second end mounted to the axle attachment member, a second control arm having a first end mounted to a second frame hanger boss positioned on the frame hanger, and a second end mounted to the axle attachment member, wherein the second control arm extends from a centerline of the first control arm at an angle alpha so that the first control arm and the second control arm are not parallel to each other, wherein the first control arm has a centerline that extends from the first end of the first control arm to the second end of the first control arm, wherein the second control arm has a centerline that extends from the first end of the second control arm to the second end of the second first control arm, and wherein the centerline of the first control arm and the centerline of the second control arm extend to intersect at a point that is at a virtual center of rotation.

The suspension assembly may optionally be configured as a trailing configuration with control arms positioned closer to the front of a vehicle than the first axle, or may be optionally configured as a leading configuration with control arms positioned further from the front of a vehicle than the first axle.

The suspension assembly may also optionally be configured so that the virtual center of rotation is positioned 35 to 50 inches from a centerline of the vehicle axle; and may also optionally be configured so that the angle alpha between the first control arm and the second control arm is from about 9 degrees to about 23 degrees. The suspension assembly may also be configured so that the virtual center of rotation is from 77% to 131% of the distance of the lateral spacing distance X between the centerlines of control rods positioned on opposite sides of a vehicle.

In a further aspect, a suspension assembly for supporting a longitudinally extending vehicle frame rail above first and second vehicle axles forming a tandem axle configuration is provided having a frame hanger having a frame attachment portion adapted for mounting to the vehicle frame rail, a first axle attachment member mounted to the first vehicle axle, a first control arm having a first end mounted to, and extending from, a first frame hanger boss positioned on the frame hanger, and a second end mounted to the axle attachment member, a second control arm having a first end mounted to a second frame hanger boss positioned on the frame hanger, and a second end mounted to the first axle attachment member, wherein the second control arm extends from the a centerline of the first control arm at an angle alpha so that the first control arm and the second control arm are not parallel to each other, wherein the first control arm extends from the first frame hanger boss and has a centerline that extends from the first end of the first control arm to the second end of the first control arm, wherein the second control arm extends from the second frame hanger boss and has a centerline that extends from the first end of the second control arm to the second end of the second first control arm, wherein the centerline of the first control arm and the centerline of the second control arm extend to intersect at a point that is at a first virtual center of rotation, a second axle attachment member mounted to the second vehicle axle, a third control arm having a first end mounted to, and extending from, a third frame hanger boss positioned on the frame hanger, and a second end mounted to the second axle attachment member, a fourth control arm having a first end mounted to a fourth frame hanger boss positioned on the frame hanger, and a second end mounted to the second axle attachment member, wherein the fourth control arm extends from a centerline of the third control arm at an angle alpha so that the third control arm and the fourth control arm are not parallel to each other, wherein the third control arm extends from the third frame hanger boss and has a centerline that extends from the first end of the third control arm to the second end of the third control arm, wherein the fourth control arm extends from the fourth frame hanger boss and has a centerline that extends from the first end of the fourth control arm to the second end of the fourth first control arm, wherein the centerline of the third control arm and the centerline of the fourth control arm extend to intersect at a point that is at a second virtual center of rotation.

BRIEF DESCRIPTION OF THE DRAWINGS

Exemplary embodiments of the invention are described herein with reference to the drawings, wherein like parts are designated by like reference numerals, and wherein:

FIG. 9 is a perspective side view of suspension assembly 210a shown in FIG. 5 with a first virtual center of rotation 269 at the intersection of centerline 265 and centerline 263;

DETAILED DESCRIPTION

Figure 1:
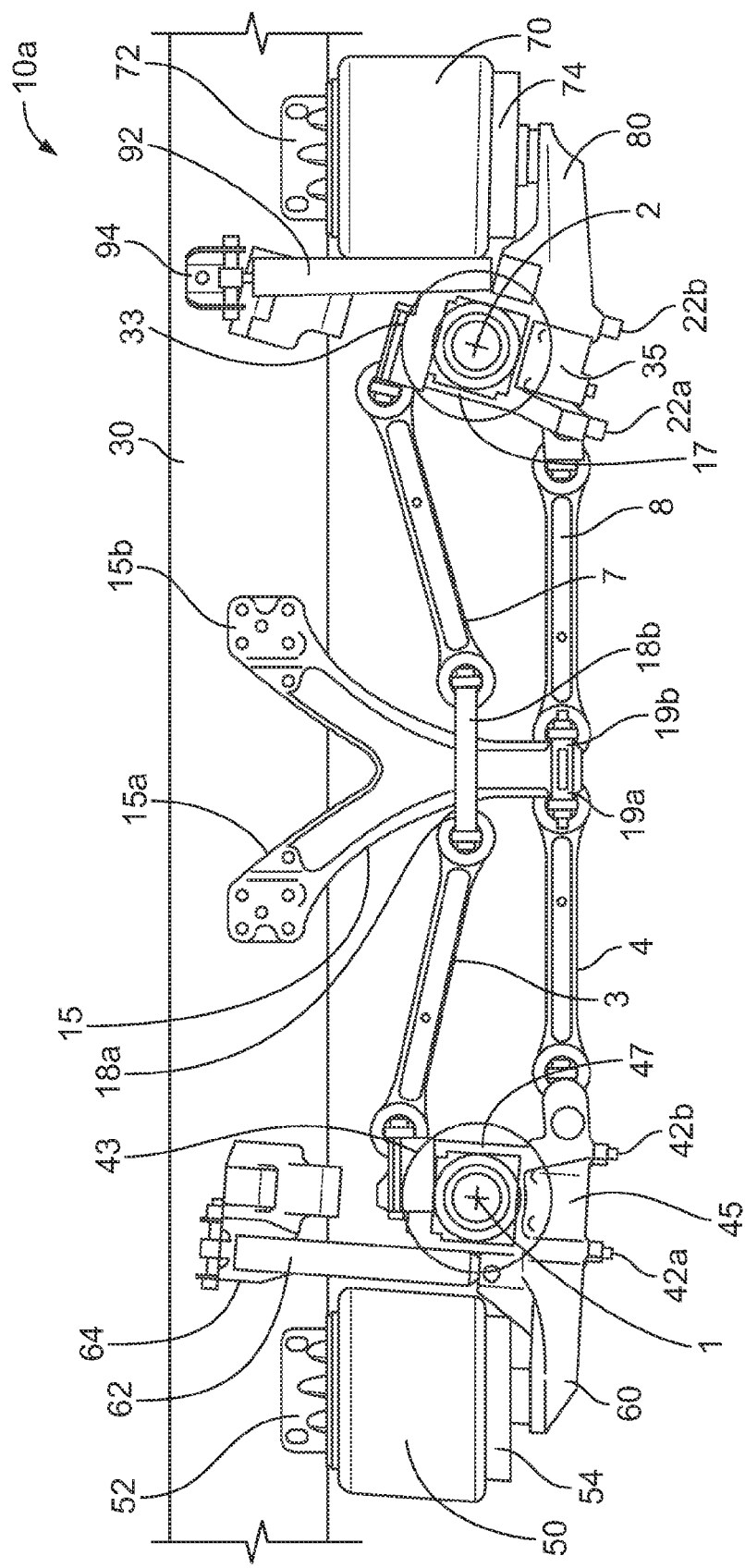
FIG. 1 is a side view of a suspension assembly 10a shown attached to a vehicle frame rail 30 in a leading/trailing configuration.

FIG. 1 is a side view of a suspension 10a shown attached to a vehicle frame rail 30, with a first vehicle axle 2 positioned farther from the front of the vehicle than second vehicle axle 1. In particular, suspension 10a in this embodiment is shown in a leading/trailing configuration where the second vehicle axle 1 is positioned closer to the front of the vehicle than the control arms 3 and 4, and the first vehicle axle 2 is positioned farther from the front of the vehicle than control arms 7 and 8.

Figure 2:
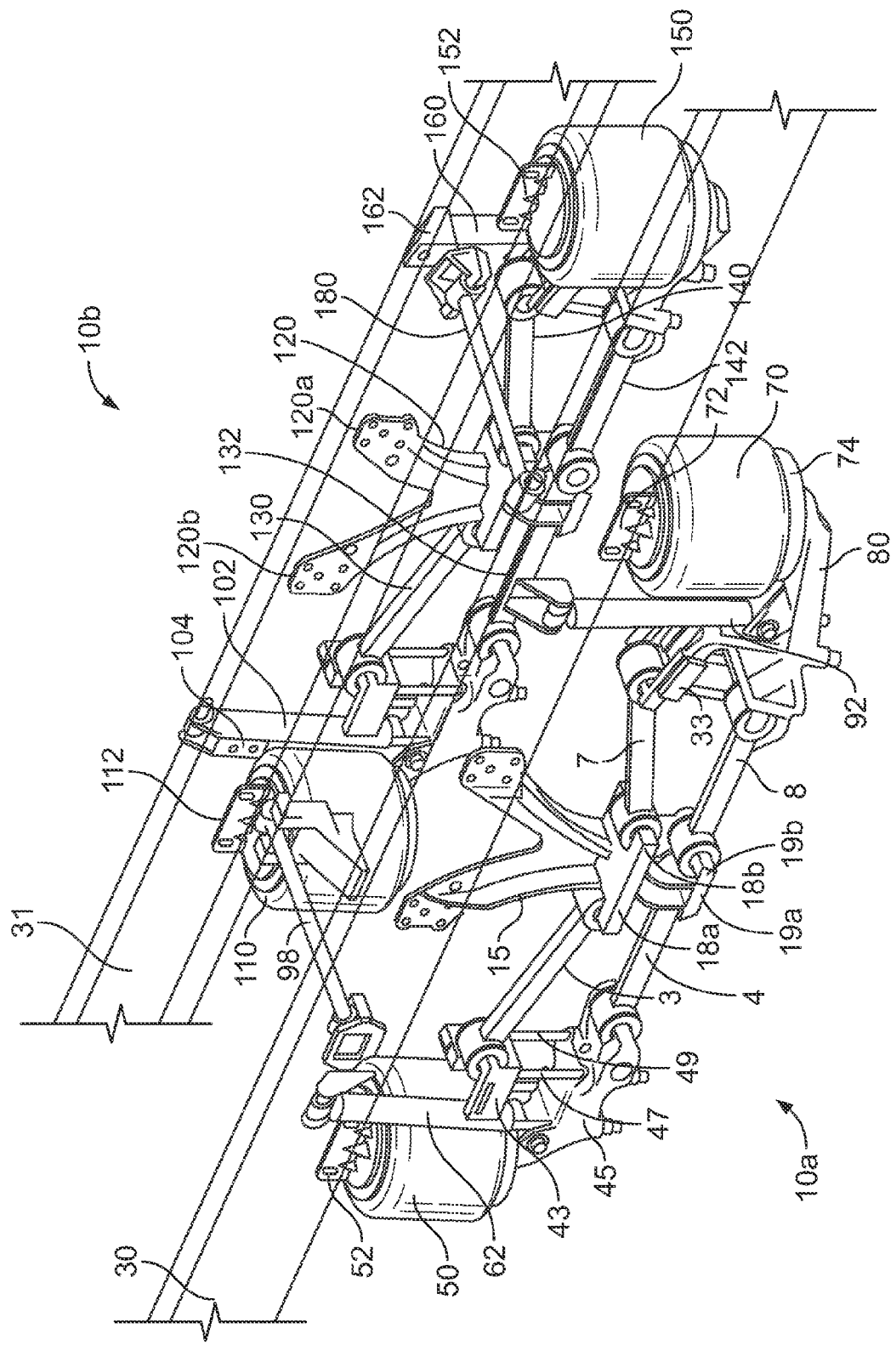
FIG. 2 is a perspective view of suspension assembly 10a shown in FIG. 1 attached to vehicle frame rail 30, and suspension assembly 10b attached to vehicle frame rail 31.

The vehicle suspension 10a is designed to support a longitudinally extending vehicle frame rail 30 above laterally extending vehicle axles 1 and 2 of a tandem axle configuration. As will be appreciated by those skilled in the art, components for the vehicle suspension 10a and other suspensions described herein may be duplicated on each side of the vehicle. For example, as shown in FIG. 2, vehicle suspension 10a is shown mounted to vehicle frame rail 30 located on one side of the vehicle, and vehicle suspension 10b, which is a mirror image of vehicle suspension 10a, is shown mounted to vehicle frame rail 31 located on the opposite side of the vehicle.

Vehicle frame rails 30 and 31 may have various configurations or cross-sections, such as C-shaped or I-shaped frame rails. As will be appreciated by those skilled in the art, vehicle wheels (not shown) may be mounted to the ends of the vehicle axles 1 and 2 in a known manner. Further, it will be appreciated that the vehicle frame rails 30 and 31 may be connected by one or more vehicle frame cross members (not shown).

It will also be appreciated that vehicle suspension 10a, and the components used therein are exemplary, and that the various components could have different shapes and sizes. Thus, for example, frame hanger 15 could have a different shape, and could have an integral frame attachment portion, or a frame attachment portion that is attached to frame hanger 15. In addition, as used herein, the term "control arm" is to be broadly construed and may be synonymous with the term "control rod," and includes any member that is used to connect one vehicle component to another vehicle component.

It should be understood that the term "vehicle" is used broadly herein to encompass all kinds of vehicles, including, but not limited to, all forms of cars, trucks, buses, recreational vehicles (RVs), etc., whether or not they include an engine. Moreover, for purposes of this description, unless specifically described otherwise, the term "vehicle" herein refers to a vehicle or a trailer. In this way, for example, a vehicle suspension system refers to a vehicle suspension or a trailer suspension. Furthermore, for purposes of this description, "outboard" refers to a position further away from a center line, running from the front to the back of a vehicle, relative to "inboard" which refers to a position closer to that same center line. Thus, the outboard side of frame rail 30 faces away from frame rail 31, whereas the inboard side of frame rail 30 faces towards frame rail 31.

Suspension 10a includes a frame hanger 15 that includes a frame attachment portion 15a and a frame attachment portion 15b that include a plurality of holes that may be used to mount the frame hanger 15 to frame rail 30. Preferably, frame hanger 15 is mounted to frame rail 30 at the midpoint between first vehicle axle 2 and second vehicle axle 1. Of course, the shape of frame hanger 15 and frame attachment portions 15a and 15b are exemplary and could have a different shape or configuration. A first axle attachment clamp group is mounted to first vehicle axle 2 and comprises an upper axle attachment member 33 and a lower axle attachment member 35 secured to first vehicle axle 2 with a U-shaped bolt 17 and nuts 22a and 22b.

A first control arm 8 is attached to frame hanger 15 at a first frame hanger boss 19b, and first control arm 8 is also attached to lower axle attachment member 35. Second control arm 7 is attached to frame hanger 15 at a second frame hanger boss 18b, and second control arm 7 is also attached to upper axle attachment member 33. First control arm 8 is shown extending horizontally from frame hanger 15, and second control arm 7 extends at an angle alpha from a centerline of first control arm 7 (see FIG. 4) so that first control arm 8 and second control arm 7 are not parallel. As will be discussed in more detail below, although control arm 8 is shown extending horizontally from the frame hanger 15, it is not required to extend horizontally. In fact, neither the upper or lower control arm is required to extend horizontally, although in some applications a horizontally extending control arm may be desired. Furthermore, unless specifically stated otherwise, as used herein, the term "horizontally" is not intended to mean absolute vertical, but means a control arm that generally extends horizontally plus or minus 5 degrees or so. In addition, the term "frame hanger boss" as used herein is to be construed broadly to mean any portion on a frame hanger where a control arm may be attached to the frame hanger.

An air spring mount 80 is shown extending from the lower axle attachment portion. An air spring 70 is positioned atop spring mount 80 on base 74 with a frame attachment portion 72 mounted to vehicle frame rail 30. In addition, a shock absorber 92 has one end mounted to spring mount 80 and another end mounted to vehicle frame rail 30 with frame attachment portion 94. To this point, the trailing suspension portion positioned about first vehicle axle 2 of suspension assembly 10a has been described. In some embodiments, this trailing suspension portion could also be positioned about the second vehicle axle 1 to form a trailing/trailing suspension configuration. This could desirable in vehicles having three axles, where a trailing/trailing/trailing suspension configuration could be used. In fact, any combination of leading and/or trailing suspension configurations could be used where the suspension about one axle is not attached to the suspension on another axle. Therefore, a leading/leading/leading suspension could also be used.

As shown in FIG. 1, vehicle suspension 10a is a leading/trailing suspension configuration. A second axle attachment clamp group is mounted to second vehicle axle 1 and comprises an upper axle attachment member 43 and a lower axle attachment member 45 secured to second vehicle axle 1 with a U-shaped bolt 47 and nuts 42a and 42b.

A third control arm 4 is attached to frame hanger 15 at a third frame hanger boss 19a, and third control arm 4 is also attached to lower axle attachment member 45. Fourth control arm 3 is attached to frame hanger 15 at a fourth frame hanger boss 18a, and fourth control arm 3 is also attached to upper axle attachment member 43. Third control arm 4 is shown extending horizontally from frame hanger 15, and fourth control arm 4 extends at an angle alpha from a centerline of third control arm 4 (see FIG. 4) so that third control arm 3 and fourth control arm 3 are not parallel. Although control arm 4 is shown extending horizontally from the frame hanger 15, it is not required to extend horizontally. In fact, neither the upper or lower control arm is required to extend horizontally, although in some applications a horizontally extending control arm may be desired.

An air spring mount 60 is shown extending from the lower axle attachment portion. An air spring 50 is positioned atop spring mount 60 on base 54 with a frame attachment portion 52 mounted to vehicle frame rail 30. In addition, a shock absorber 62 has one end mounted to spring mount 60 and another end mounted to vehicle frame rail 30 with frame attachment portion 64. The leading suspension portion positioned about second vehicle axle 1 with control arms 3 and 4 has now been described. In some embodiments, this leading suspension portion could also be positioned about the first vehicle axle 2 to form a leading/leading suspension configuration. This could desirable in vehicles having three axles, where a leading/leading/leading suspension configuration could be used, and as noted above, where a trailing/trailing/trailing suspension configuration could be used.

The control arms 3, 4, 7, and 8, the frame hanger 15, and upper and lower axle attachment members 33, 35, 43, and 45 are preferably comprised of steel. The control arms 3, 4, 7, and 8 may be comprised of circular tubes, which may have suitable compressive and tensile strength properties. However, it will be appreciated that the control arms are not required to be tubular, or circular, and could have a wide variety of cross-sections, such as I-beam, rectangular or oval, as examples, and could be solid or tubular. Control arms 3, 4, 7, and 8 may have the same cross section (as shown in FIG. 1), or may each have different cross sections. Control arms 3, 4, 7, and 8 may be attached to frame hanger 15 using bushings, such as bar pin bushings, and may similarly be attached to the upper and lower axle attachment members using bushings, such as bar pin bushings.

FIG. 2 shows a perspective view of suspension assembly 10a mounted to vehicle frame rail 30 and suspension assembly 10b, which is a mirror image of suspension assembly 10a, mounted to vehicle frame rail 31, with vehicle frame rails 30 and 31, and vehicle axles 1 and 2 shown in gray. Suspension assembly 10b includes a frame hanger 120 that includes a frame attachment portion 120a and a frame attachment portion 120b that include a plurality of holes that may be used to mount the frame hanger 120 to frame rail 31. Frame hanger 120 is mounted to frame rail 31 at the midpoint between first vehicle axle 2 and second vehicle axle 1.

A first control arm 142 is attached to frame hanger 120 and is also attached to a lower axle attachment member positioned about second vehicle axle 2. Second control arm 140 is attached to frame hanger 120 and is also attached to an upper axle attachment member positioned about second vehicle axle 2. First control arm 142 is shown extending horizontally from frame hanger 120, and second control arm 140 extends at an angle alpha from a centerline of first control arm 142 so that first control arm 142 and second control arm 140 are not parallel.

An air spring 150 is attached to vehicle frame rail 31 with frame attachment portion 152. In addition, a shock absorber 160 is also mounted to vehicle frame rail 31 with frame attachment portion 162. The frame attachment portions for attaching the air springs to the frame rails shown throughout Figures, such as frame attachment portion 152, are shown with an exemplary configuration, and it will be appreciated that the frame attachment portions for mounting the air springs to the frame rails could have a variety of mounting configurations, and differing shapes and mounting options, with single or double fasteners through a web or flange, as examples.

Similarly, the frame attachment portions for attaching the shock absorbers to the frame rails shown throughout the Figures, such as frame attachment portion 162, are shown with an exemplary configuration, and it will be appreciated that the frame attachment portions for mounting the shock absorbers to the frame rails could have a variety of mounting configurations, and differing shapes and mounting options, with single or double fasteners through a web or flange, as examples.

A third control arm 132 is attached to frame hanger 120 and is also attached to a lower axle attachment member positioned about second vehicle axle 1. Fourth control arm 130 is attached to frame hanger 120 and is also attached to upper axle attachment member positioned about second vehicle axle 1. Third control arm 132 is shown extending horizontally from frame hanger 120, and fourth control arm 130 extends at an angle alpha from third control arm 132 so that third control arm 132 and fourth control arm 130 are not parallel.

An air spring 110 is attached to vehicle frame rail 31 with frame attachment portion 112. In addition, a shock absorber 102 is also mounted to vehicle frame rail 31 with frame attachment portion 104.

In some applications it is desirable to include a transverse control rod, which may also be referred to as a torque rod or transverse torque rod (TVTR). The use of a TVTR provides high lateral stiffness, and allows the suspension assembly to develop additional roll stiffness due to MZ bushing stiffness (resistance to conical deflection of the bushing about the vertical axis of the vehicle), in a three dimensional space defined by x, y, and z axes, where x is the longitudinal direction, y is the transverse direction, and z is the vertical direction. Where a TVTR is not used, high MZ bushing stiffness would be required, or high lateral compliance would need to be tolerated.

In FIG. 2, a transverse rod 180 includes a first end that is mounted to an inboard side of vehicle frame rail 31 and transverse rod 180 extends laterally (transverse to the frame rails 30 and 31) towards vehicle frame rail 30 above first vehicle axle 2. The second end of transverse rod 180 is mounted to a bracket on first vehicle axle 2. The use of the transverse rod 180 provides additional lateral stiffness and auxiliary roll stiffness to the suspension assembly.

A second transverse rod may also be used above second vehicle axle 1 to provide additional lateral stiffness and auxiliary roll stiffness to the suspension assembly. Second transverse rod 98 includes a first end that is mounted to an inboard side of vehicle frame rail 30 and transverse rod 98 extends laterally (transverse to the frame rails 30 and 31) towards vehicle frame rail 31 above second vehicle axle 1. The second end of transverse rod 98 is mounted to an axle housing of second vehicle axle 1. The use of the transverse rod 98 provides additional lateral stiffness and auxiliary roll stiffness to the suspension assembly. It will be appreciated that transverse rod 180 extends from one frame rail, and transverse rod 98 extends from the opposite frame rail. The mounting of the transverse rods 180 and 98 on opposite sides of the vehicle provides symmetry and greater stability.

Figure 3:
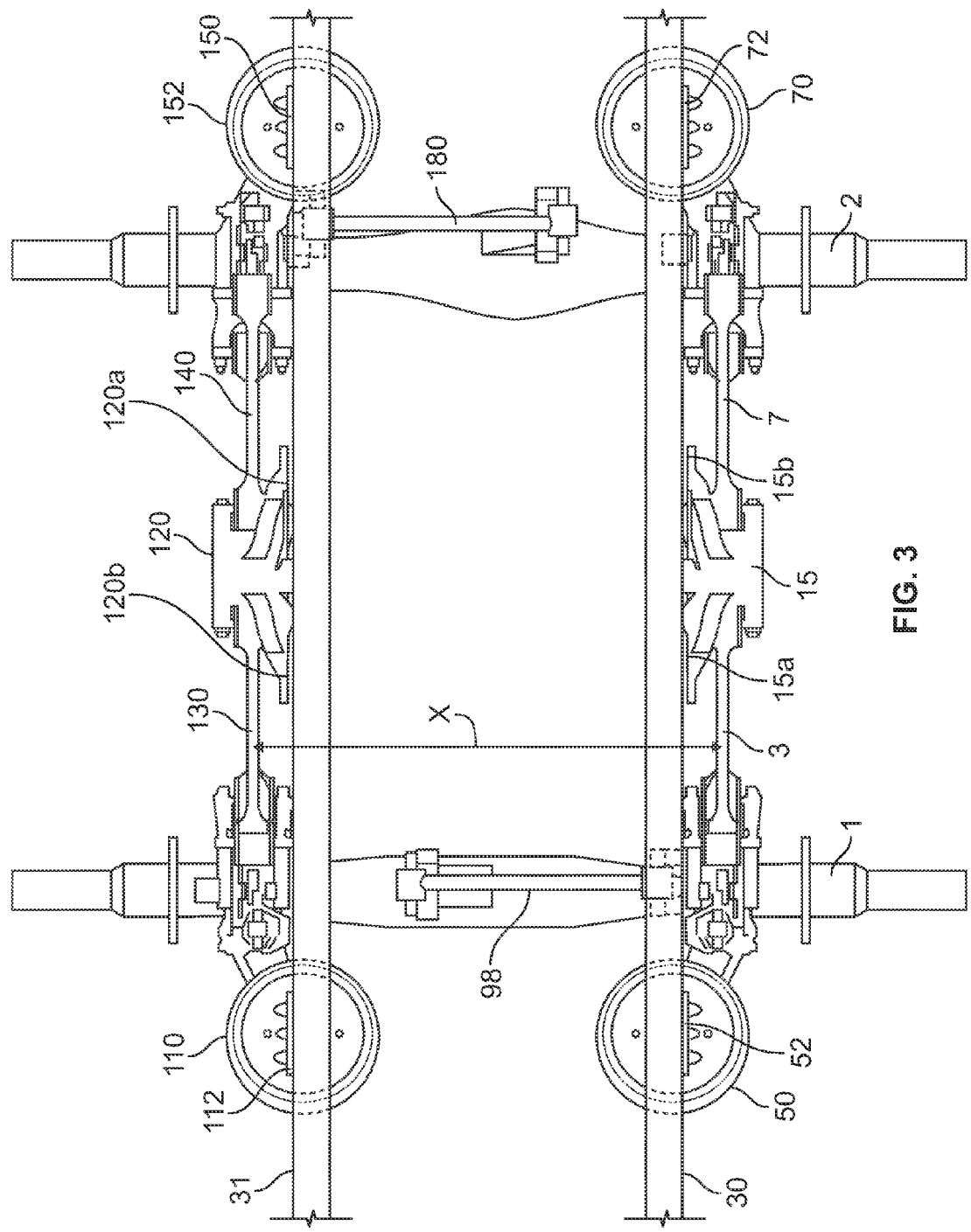
FIG. 3 is a top view of suspension assembly 10a and suspension assembly 10b shown in FIG. 2.

FIG. 3 is a top view of the suspension assembly 10a and suspension assembly 10b shown in FIG. 2. Frame hanger 15 is positioned outboard of vehicle frame rail 30 and mounted to vehicle frame rail 30 with frame attachment portions 15a and 15b. Upper control rods 3 and 7 are shown extending from frame hanger 15. Similarly, frame hanger 120 is positioned outboard of vehicle frame rail 31 and mounted to vehicle frame rail 31 with frame attachment portions 120a and 120b. Upper control rods 130 and 140 are shown extending from frame hanger 120.

It will be appreciated that the lateral or transverse distance between the control arms on opposing ends of the axle, shown as Dimension X in FIG. 3, will affect the degree of axle twist and hence the roll stiffness developed. In this embodiment, the control rods are mounted outside the vehicle frame rails 30 and 31 where the upper control rods (3, 7, 130, and 140) are spaced at a distance equivalent to the lower control rods (4, 8, 132, and 142). This spacing "X" could be altered in order to change the torsional resistance to axle twist and therefore the roll stiffness developed. However, in this embodiment auxiliary roll stiffness is developed based on the spacing of the control arms outboard of the vehicle frame rails 30 and 31 and their attachment to the first and second vehicle axles 1 and 2.

In addition, air spring 70 is shown mounted to vehicle frame rail 30 with frame attachment bracket 72, where air spring 70 is shown positioned beneath vehicle frame rail 30 and located on an opposite side of first vehicle axle 2 than control rods 7 and 8. Air spring 50 is shown mounted to vehicle frame rail 30 with frame attachment bracket 52, where air spring 50 is shown positioned beneath vehicle frame rail 30 and located on an opposite side of second vehicle axle 1 than control rods 3 and 4. Similarly, air spring 150 is shown mounted to vehicle frame rail 31 with frame attachment bracket 152, where air spring 150 is shown positioned beneath vehicle frame rail 31 and located on an opposite side of first vehicle axle 2 than control rods 140 and 142. Air spring 110 is shown mounted to vehicle frame rail 31 with frame attachment bracket 112, where air spring 110 is shown positioned beneath vehicle frame rail 31 and located on an opposite side of second vehicle axle 1 than control rods 130 and 132.

The positioning of the air springs on the opposite side of the axle to the control rods means that the upper rods are in tension, when the vehicle is at rest under a load. During the course of driving, accelerating, and braking, the upper rods will undergo tension/compression reversals, but in a static condition under a load, the upper rods would be in tension. The force vector along the rods, when resolved into a horizontal and vertical component, enable a downward force to act through the clamp group or axle attachment members, thus reducing the load carried by the air springs. As a result, either a lower air spring pressure may be used which may reduce fill time or allow a smaller (or lighter) air spring to be used, or a correspondingly greater axle load carried.

Figure 4:
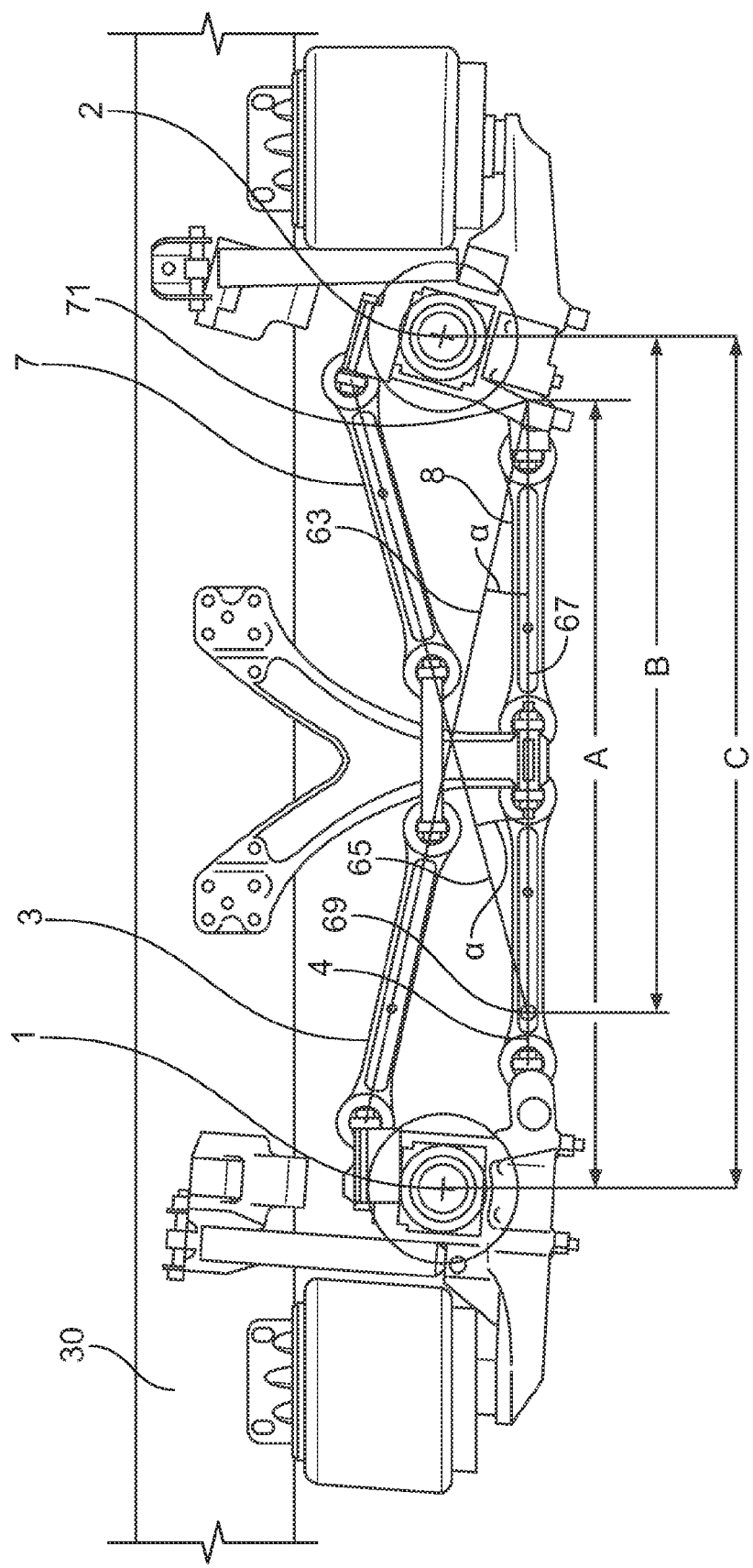
FIG. 4 is a side view of suspension assembly 10a shown in FIG. 1 with a first virtual center of rotation 69 at the intersection of centerline 65 and centerline 67, and a second virtual center of rotation 71 at the intersection of centerline 63 and centerline 67.

FIG. 4 is a side view of suspension assembly 10a shown in FIG. 1. A centerline 65 is shown extending within upper control arm 7. In this embodiment, because upper control arm is a straight member, centerline 65 is contained within upper control arm 7. In addition, a centerline 63 is shown extending within upper control arm 4, and, in this embodiment, because upper control arm 4 is a straight member, centerline 63 is contained within upper control arm 4. Similarly, centerline 67 is shown extending within lower control arm 8, as well as within lower control arm 3. Again, in this embodiment, because both lower control arms 8 and 3 are straight members, the centerline 67 is contained within lower control arms 8 and 3.

In FIGS. 1-4, the control arms are shown as straight members. However, the control arms could be curved and/or have a varying cross sectional shape along its length. Thus, the control arms are not required to be straight members. However, if the control arm were curved to any significant degree, then a centerline extending from one end to the other would not be contained within the control arm. The centerline of a curved member would still be drawn from the centerline of the bushing attachments, and thus may not be wholly contained within the control arm as is the case when the control arm is straight member.

In FIGS. 1-4, lower control arm 8 is shown extending horizontally from the frame hanger, whereas upper control arm 7 is shown extending at an angle alpha from the lower control arm 8. Similarly, lower control arm 3 is shown extending horizontally from the frame hanger, whereas upper control arm 4 is shown extending at an angle alpha from the lower control arm 3. As noted above, neither of the control arms are required to extend horizontally from the frame hanger. The angle alpha is simply the angle at which the extended centerlines of the control arms intersect. The angle alpha is approximately a function of the desired virtual center location and the vertical distance between the upper control arm axle mounting location and the lower control arm axle mounting location. Typically, the vertical distance is between 8 and 14 inches, and with a desired virtual center location of 35 to 50 inches, the angle alpha will typically fall between 9 and 23 degrees. In a preferred embodiment, the virtual center location is between 38 and 42 inches from the centerline of the axle. In addition, in a preferred embodiment, the angle alpha is between 16 and 20 degrees.

It will be appreciated that the configuration of control arms 7 and 8 is symmetrical with the configuration of control arms 3 and 4 in this leading/trailing configuration Calculations have shown that the configuration of this system in a leading-trailing configuration will be non-reactive to braking and driving axle torque, meaning that it is generally free of significant axle wind-up or torque. It is also non-reactive to frame rise in this leading/trailing configuration, meaning little or no frame rise. Since there is symmetry in the linkage geometry about the suspension center (i.e. frame hanger center) the reaction loads in the upper control rods 3 and 7 will be equal and opposite—the forces in one control rod would tend to raise the frame, the forces in the other would tend to cause the frame to "dive" or "squat." The vertical load vectors of the control rod forces counteract each other and the neutral frame position is maintained. Thus, the suspension assembly 10a shown in FIGS. 1-4 has the benefit of being non-torque reactive, as compared to non-symmetrical suspension assemblies. In a non-torque reactive suspension, there is little or no frame rise or change in the pinion angle of the axle.

In addition, because of the symmetrical configuration of the control arms, the linkage geometry in one axle will cause a roll oversteer gradient. However this is balanced by a roll understeer gradient developed by the symmetrically opposed geometry on the other axle. The positioning of the height of the virtual center of rotation with respect to the centerline of the axles can be used to adjust the understeer or oversteer characteristics of the suspension assembly. For example, an instant center positioned above the axle centerline will cause the suspension to understeer; whereas an instant center positioned below the axle centerline will cause the suspension to oversteer. Therefore, where additional understeer in the suspension is desired, the instant center can be raised. Similarly, where additional oversteer in the suspension is desired, the instant center can be lowered. Thus, by altering the height of the instant center of rotation, desired understeer or oversteer characteristics may be achieved, while the roll stiffness of the suspension remains relatively constant.

The non-parallel configuration of the upper and lower control arms results in a configuration where a theoretical extension of these linkages develops a "virtual center" of rotation where the extended centerlines of the control arms intersect. In particular, in FIG. 4, centerline 65 of upper control arm 7 and centerline 67 of lower control arm 8 are extended beyond the ends of those control arms where they intersect at a first virtual center of rotation 69. In the same fashion, centerline 63 of upper control arm 4 and centerline 67 of lower control arm 3 are extended beyond the ends of those control arms where they intersect at a second virtual center of rotation 71. In this embodiment, the distance between the centerline of first vehicle axle 2 and the centerline of second vehicle axle 1 is a distance C. In addition, the first virtual center of rotation 69 is positioned at a distance B from the centerline of the first vehicle axle 2, whereas the second virtual center of rotation 71 is positioned at a distance A from the centerline of the second vehicle axle 1.

The distance A and the distance B are a function of the angular relationship between the upper and lower control arms and can be increased or decreased by changing the orientation of either the upper control arm or the lower control arm. In the symmetrical configuration of the upper and lower control arms shown in FIGS. 1-4, the distance A may be the same as distance B. The virtual center length may be optimized when combined with the axle torsional stiffness to generate a desired level of roll stability. The linkage arrangement of the control arms or the "linkage kinematics" will force a torsional axle input during a roll maneuver. The length of the virtual center (distance A or distance B) will govern the amount of axle twist. The axle's resistance to twist is the mechanism that will develop the auxiliary roll stiffness.

Calculations, computer simulations, and experimental data indicate that for tandem axle truck suspensions where the axles are spaced between 52" and 55", the optimum virtual center will lie between 40" and 50" from the axle centerline. The specific dimension A (or B) would be developed based on axle spacing and required roll stiffness for a given vehicle application. However, the optimum virtual center will lie between about 77% to about 91% of the lateral distance C between the centerlines of the vehicle axles.

The optimum virtual center location may be expressed in relation to the lateral spacing between the centerlines of the control rods on opposite sides of the vehicle, which may of particular usefulness when considering a single axle. Calculations, computer simulations, and experimental data indicate that for truck suspensions using typical axle housings where the distance X shown in FIG. 3 typically falls between 38" and 42", the optimum virtual center will lie between 35" and 50" from the centerline of the vehicle axle. The specific dimension A (or B) would be developed based on lateral spacing of the control arms and required roll stiffness for a given vehicle application. However, the optimum virtual center will lie between about 83% to about 131% of the lateral distance X between the centerlines of the control arms. In a preferred embodiment the virtual center is located between 38" and 42" from the centerline of the axle. In addition, in a preferred embodiment the virtual center will lie between 95%-105% of the lateral distance X between the centerlines of the control arms. In embodiments where the upper control arms have a spacing that is different from the spacing of the lower control arms, an average of those spacings can be used for the calculations above.

A second auxiliary roll stiffness mechanism exists within the suspension whereby the control arms act as compliance members that are tuned through the torsional and bending stiffness of the control arm structure and the conical stiffness of the bushing. The control arm stiffness (inclusive of bushing and structure) is tuned in association with the "virtual center" or "instant center" specification to achieve the optimum roll behavior.

In suspension assembly 10a, the control arms are attached to the frame hanger and upper and lower axle attachment members using bar pin bushing assemblies that extend transversely. If the attachments of the control arms were rigid and the bushings exhibited infinite radial stiffness and zero conical stiffness as in an "ideal ball joint", and the axle(s) were flexible, the instant center would provide acceptable roll stiffness.

Figure 8A:
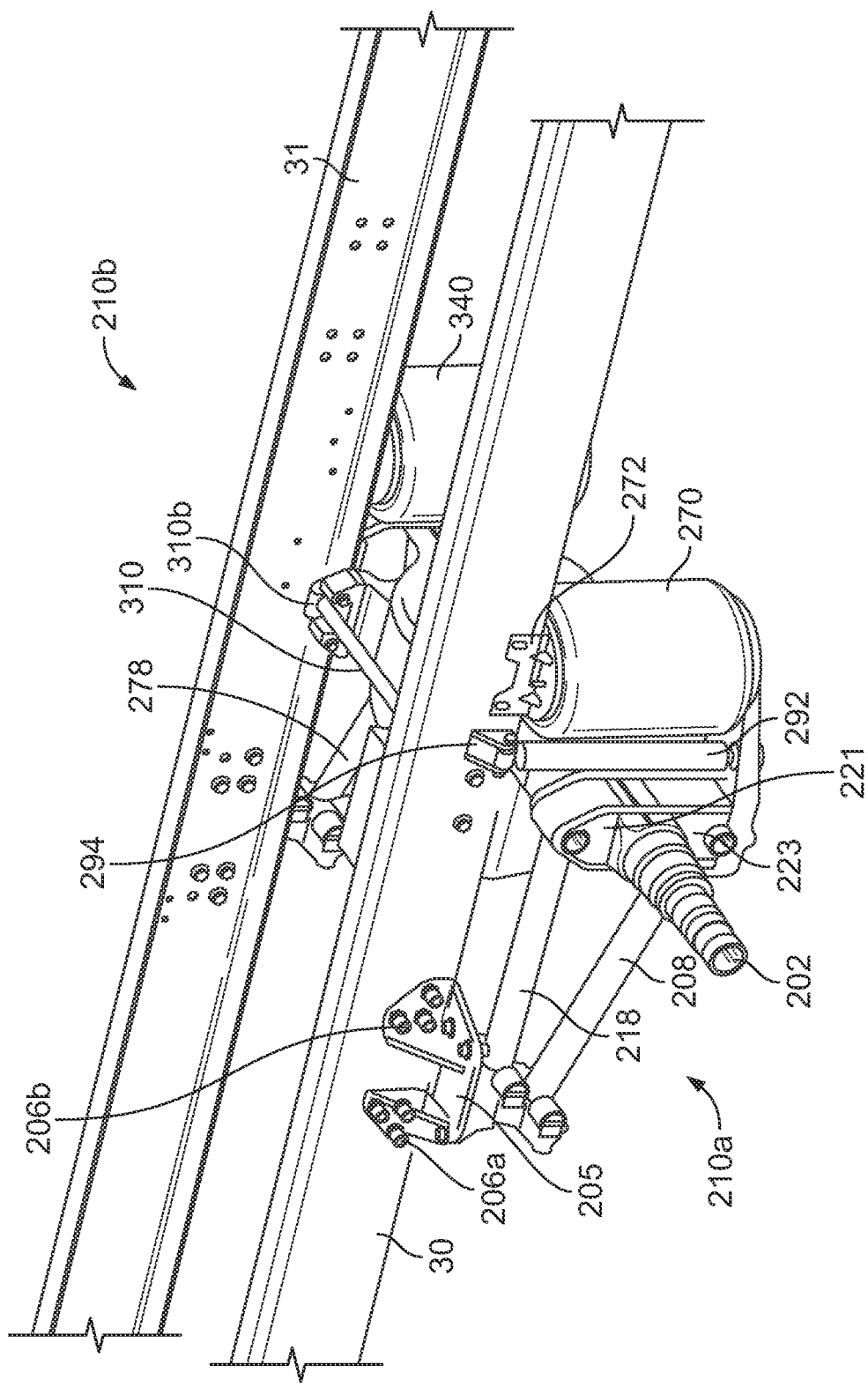
FIG. 8A is a perspective view of suspension assembly 210a shown attached to vehicle frame rail 30 and suspension assembly 210b shown attached to vehicle frame rail 31.
Figure 8B:
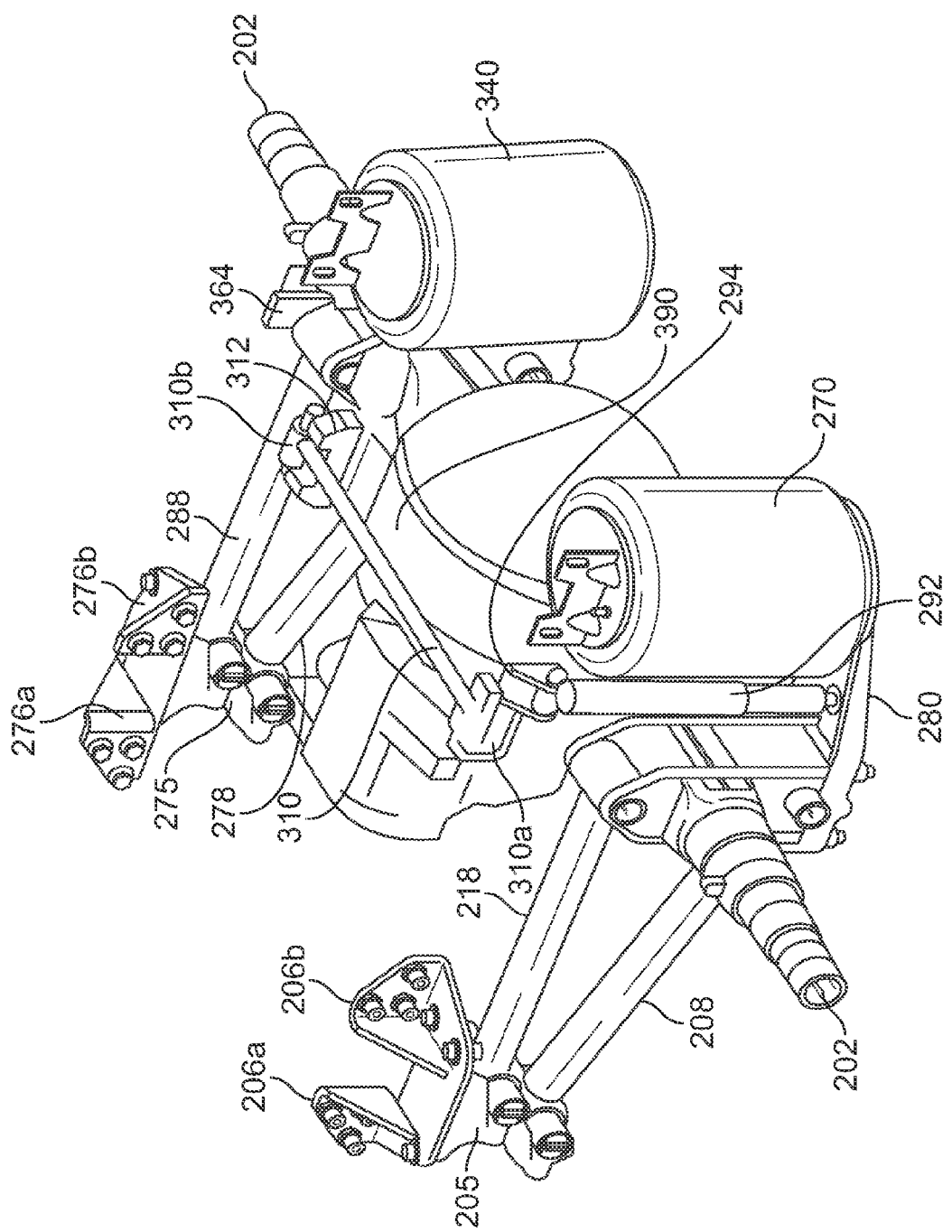
FIG. 8B is a perspective view of the suspension assembly 210a and suspension assembly 210b shown in FIG. 8A with vehicle frame rails 30 and 31 removed.
Figure 10:
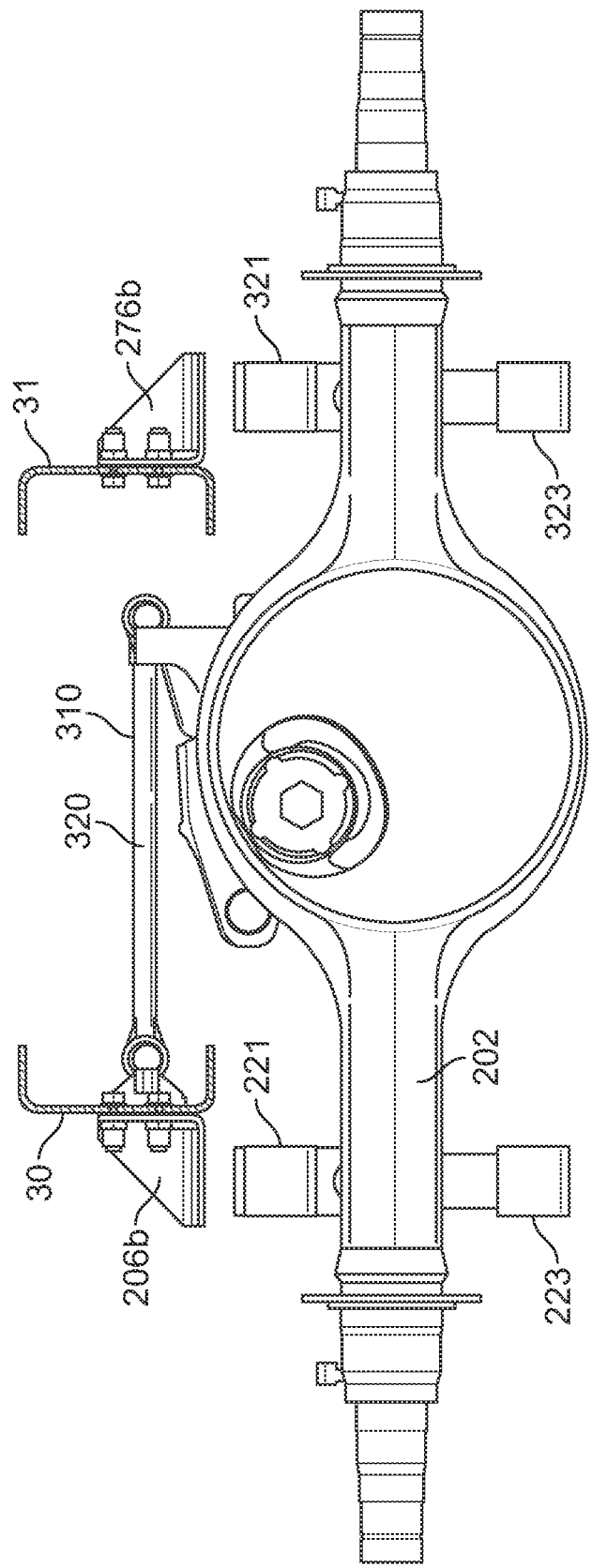
FIG. 10 is a rear view of suspension assembly 210a shown in FIG. 8A with a roll center 320 shown around the midpoint of transverse rod 310.
Figure 11:
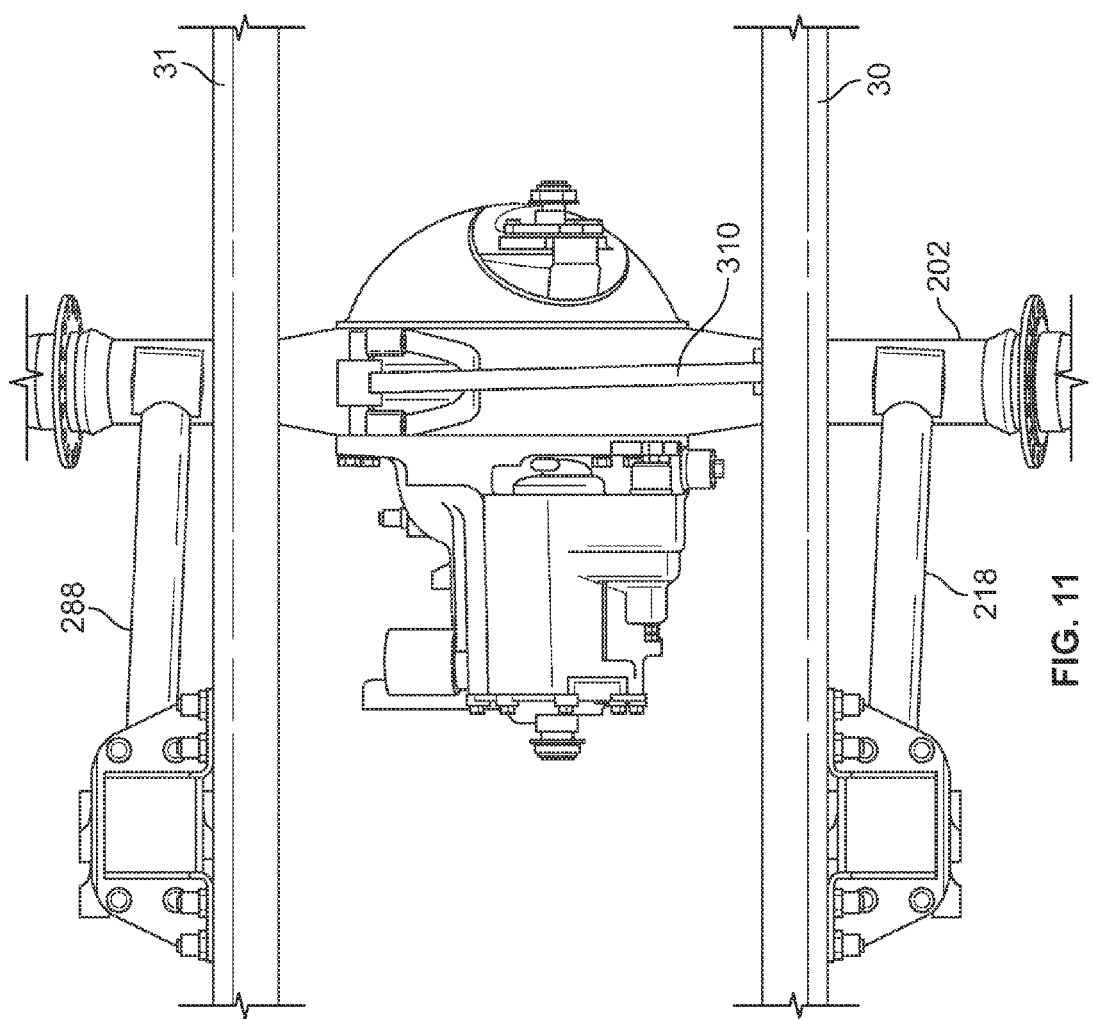
FIG. 11 is a top view of suspension assembly 210a shown in FIG. 10 when it is subjected to a roll moment.

FIG. 10 shows a rear view of the suspension assembly shown in FIGS. 8A and 8B where the "roll center", or virtual center of rotation about the longitudinal axis of the vehicle is illustrated at approximately the centerline of the transverse rod 310. When the suspension is subjected to a roll moment and deflects accordingly, the relative position of the axle end of the control arms to the roll center dictate their motion. In the case of the upper control arms shown in FIG. 11, the dominating motion of the axle attachment end of the control arm is torsion about the longitudinal axis of the torque rod 310 due to its proximity to the roll center in the vertical direction. This motion results in a conical deflection in the upper control arm bushings about the longitudinal (X) axis resulting in a conical moment (MX) being developed in the bushing and reacted through the torsional stiffness of the upper control arm. In the case of the lower control arms shown in FIG. 11, their motion includes a significant lateral offset.

Figure 12:
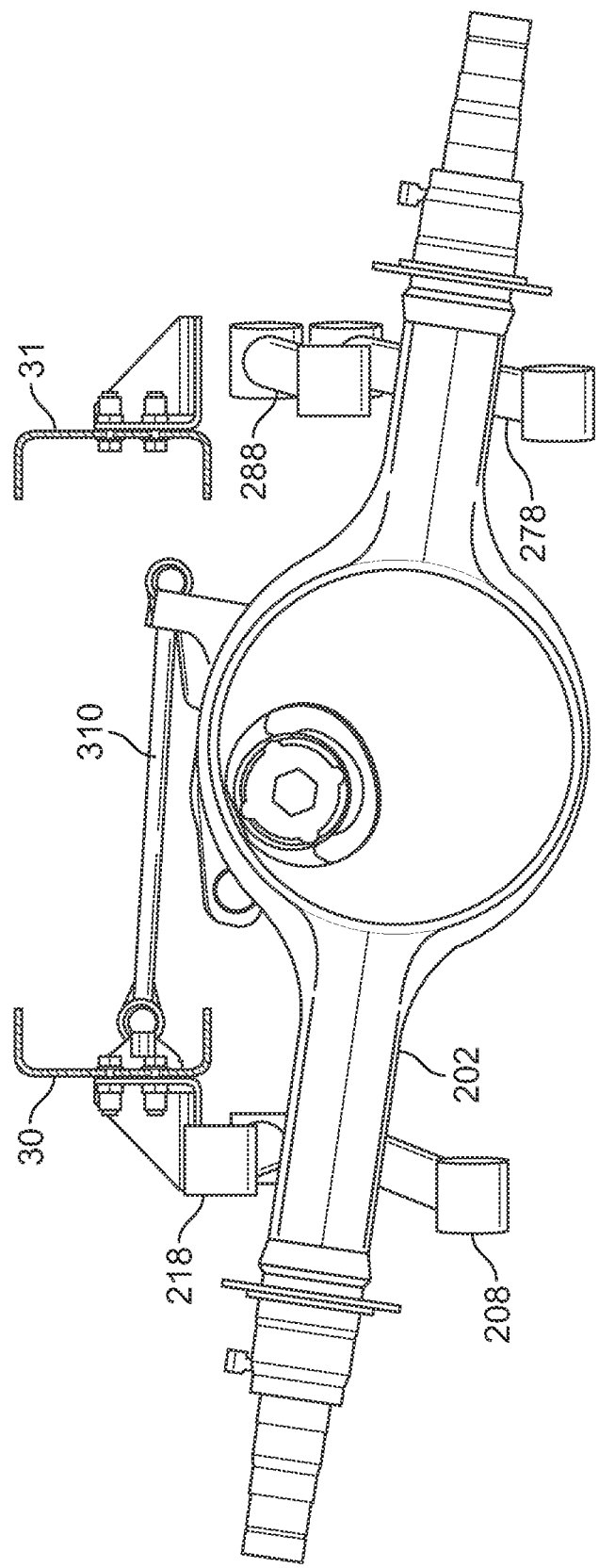
FIG. 12 is a rear view of suspension assembly 210 shown in FIGS. 10 and 11 demonstrating the effect of lateral offset on the conical deflection of the lower control arm bushings about the vertical (Z) axis resulting in a conical moment (MZ) being developed in the bushing and reacted through the bending stiffness of the lower control arm.

FIG. 12 demonstrates that effect of lateral offset on the conical deflection of the lower control arm bushings about the vertical (Z) axis resulting in a conical moment (MZ) being developed in the bushing and reacted through the bending stiffness of the lower control arm. Thus, the conical stiffness (of the bushings used to attach the control arms) about the X-axis and the Z-axis of the vehicle and the corresponding torsion and bending stiffness of the control arm structures augments the roll stiffness developed by the instant center location coupled with radial stiffness of the bushings and the torsional stiffness of the axle.

In suspension assembly 10*a*, the control arms are substantially parallel to the longitudinal axis of the vehicle and the transverse torque rod(s) provide the lateral stiffness and assists in the development of auxiliary roll stiffness. Additional lateral stiffness and roll stiffness could be developed if a non-parallel configuration of the control arms were used, e.g., if one or both of the control arms were angled towards the opposite side of the vehicle.

The respective lengths of the control arms may also be adjusted to adjust the desired pinion angle of the axle. For example, first vehicle axle 2 is a rear axle, so the lengths of control arm 7 and control arm 8 could be adjusted so that first vehicle axle 2 has a pinion angle of between 12 and 14 degrees. If a greater pinion angle were desired, then the length of control arm 7 could be made longer, or the length of control arm 8 could be made shorter. As shown in FIG. 4, the pinion angle of second vehicle axle 1 is less than that of first vehicle axle 2 and may have a desired pinion angle between 2 and 4 degrees.

Figure 5:
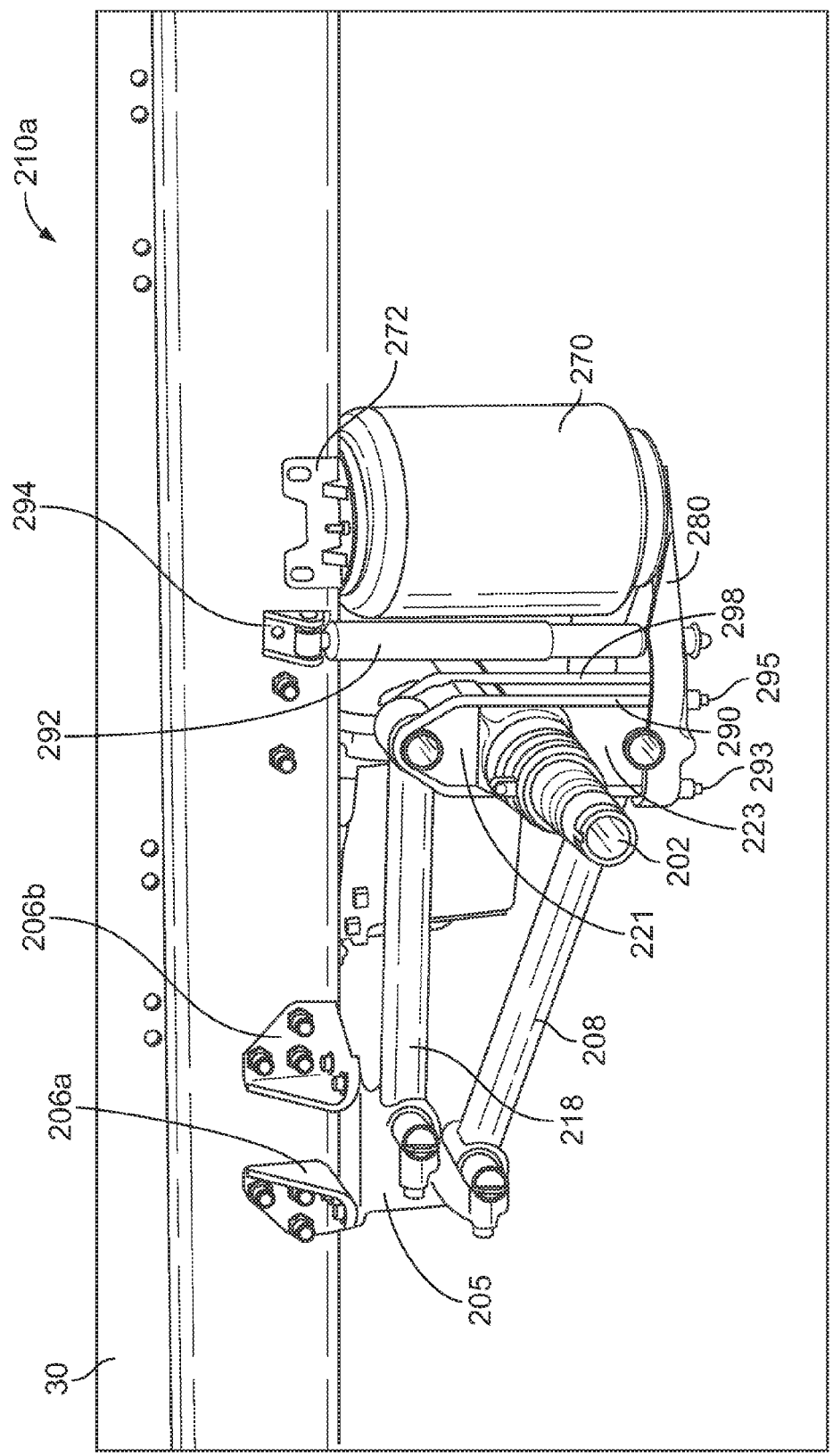
FIG. 5 is a perspective side view of suspension assembly 210a shown attached to vehicle frame rail 30 in a trailing configuration.

FIG. 5 is directed to a suspension assembly 210*a* which is similar to trailing portion of suspension assembly 10*a* shown in FIGS. 1-4, except in suspension assembly 210*a*, there is an upper control arm 218 that extends horizontally from frame hanger 205, and a lower control arm 208 that extends at an angle from frame hanger 205. Thus, in suspension 210*a* the upper control arm is horizontal and the lower control arm extends at angle, whereas in suspension 10*a*, the upper control arm extends at an angle and the lower control arm is horizontal. Of course, as noted above with respect to FIGS. 1-4, neither the upper control arm nor the lower control arm is required to extend horizontally, as both may extend at an angle from horizontal. As a result of the control arm configuration shown in FIG. 5, as will be seen, the virtual center of rotation in suspension 210*a* is higher from the ground than the virtual center of rotation in suspension 10*a*. The height of the virtual center of rotation alters the torque reactivity. The lower the virtual center of rotation is to the ground, the lower the reactivity to driving torque becomes.

Suspension 210*a* includes a frame hanger 205 that includes a frame attachment portion 206*a* and a frame attachment portion 206*b* that include a plurality of holes that may be used to mount the frame hanger 205 to frame rail 30. Of course, the shape of frame hanger 205 and frame attachment portions 206*a* and 206*b* are exemplary and could have a different shape or configuration. Moreover, in this embodiment, frame attachment portions 206*a* and 206*b* are bolted to a top surface of frame hanger 205, although they could be formed integral with the frame hanger 205. A first axle attachment clamp group is mounted to first vehicle axle 202 and comprises an upper axle attachment member 221 and a lower axle attachment member 223 secured to first vehicle axle 202 with a U-shaped bolts 290 and 298 and nuts 293 and 295 (and other nuts not shown).

A first control arm 218 is attached to frame hanger 205 and is also attached to upper axle attachment member 221. Second control arm 208 is attached to frame hanger 15 and is also attached to lower axle attachment member 223. First control arm 218 is shown extending horizontally from frame hanger 205 (but not required to be horizontal), and second control arm 208 extends at an angle alpha from a centerline of first control arm 218 so that first control arm 218 and second control arm 208 are not parallel.

An air spring mount 280 is shown extending from the lower axle attachment portion 223. An air spring 270 is positioned atop spring mount 280 with a frame attachment portion 272 mounted to vehicle frame rail 30. In addition, a shock absorber 292 has one end mounted to spring mount 280 and another end mounted to vehicle frame rail 30 with frame attachment portion 294.

In suspension assembly 210*a*, the control arms are attached to the frame hanger and upper and lower axle attachment members using bar pin bushing assemblies that extend transversely. In this arrangement, the conical stiffness of the bushings coupled with the bending and torsion stiffness of the control arm structures develops auxiliary roll stiffness in the same manner as discussed above.

Figure 6:
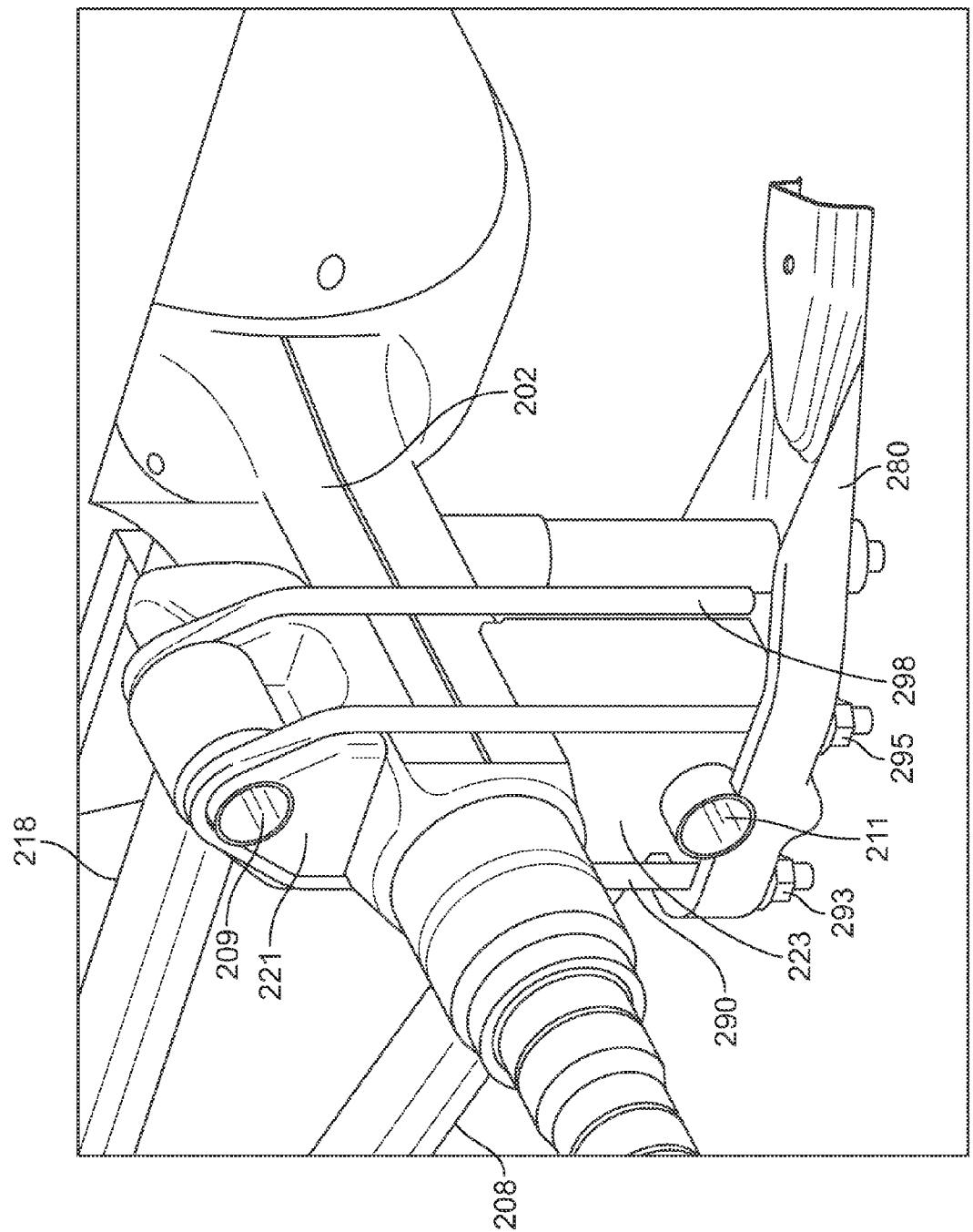
FIG. 6 is close up perspective view of the right side of suspension assembly 210a shown in FIG. 5.

FIG. 6 is a close up view of the right side of suspension assembly 210*a* shown in FIG. 5. Vehicle axle 202 is shown secured between upper axle attachment member 221 and lower axle attachment member 223 with U-shaped bolts 290 and 298 and nuts 293 and 295 (and other nuts not shown). Air spring mount 280 is shown extending rearwardly from lower axle attachment member 223. Bar pin bushing assemblies 209 and 211 extend transversely, and are used to attach control arms 218 and 208 with upper axle attachment member 221 and lower axle attachment member 223.

Figure 7A:
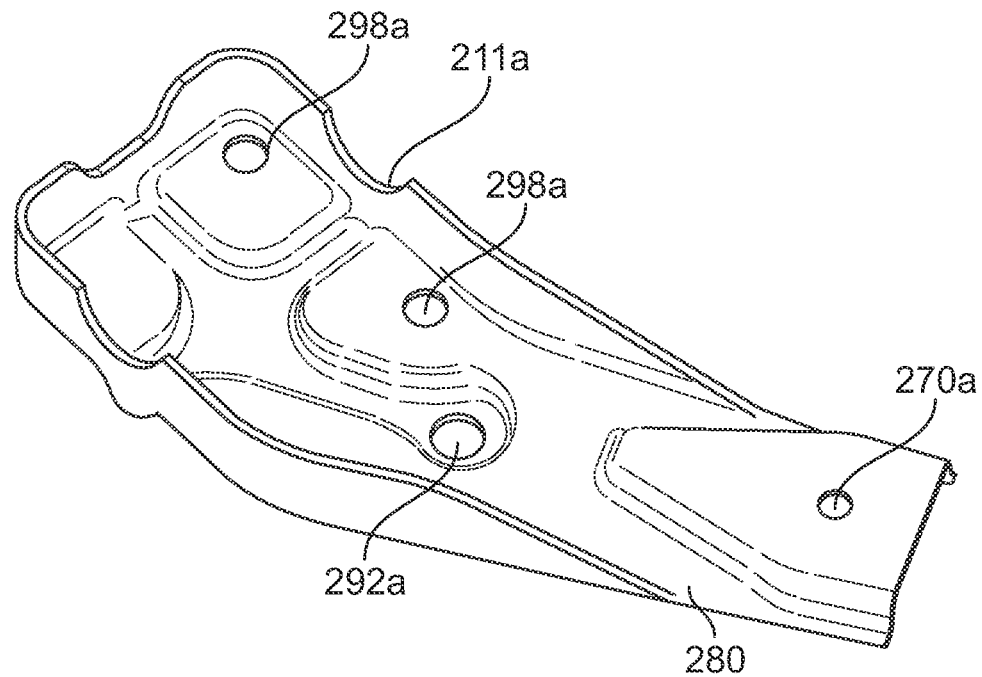
FIG. 7A is a perspective top view of air spring mount 280 shown in FIGS. 5 and 6.
Figure 7B:
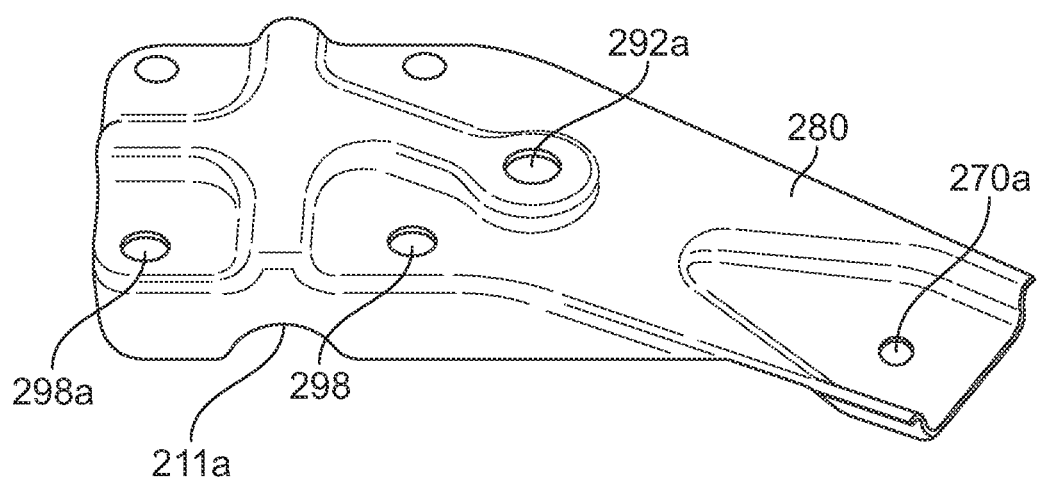
FIG. 7B is a perspective bottom view of air spring mount 280 shown in FIG. 7A.

FIG. 7A is a perspective top view of air spring mount 280 that may be used in suspension assembly 210*a* shown in FIGS. 5 and 6, as well as suspension assembly 10*a* shown in FIGS. 1-4. FIG. 7B is a perspective bottom view of the air spring mount 280 shown in FIG. 7A. Holes 298*a* are shown where U-bolt 298 may pass through to secure the first vehicle axle 2 between upper axle attachment member 221 and lower axle attachment member 223. Spring mount 280 also includes bushing relief 211*a* to accommodate a bushing 211 that is used to connect lower control arm 208 to lower axle attachment 223.

Spring mount 280 also includes an aperture 292*a* that is used for mounting the bottom of the shock absorber 292 to the spring mount 280. In addition, spring mount 280 also includes an aperture 270*a* that is used for mounting the bottom of air spring 270 to the spring mount 280. The distance of aperture 270*a* from the centerline of vehicle axle 202 may adjusted to change the lever arm ratio of the centerline of the air spring 270 versus the centerline of the first vehicle axle 2, which affects the overall spring rate of the suspension assembly 210*a*. The further the centerline of the air spring 270 is from the centerline of the vehicle axle 202, the higher the spring rate, resulting in a higher primary roll stiffness of the suspension assembly 210*a*. Also, the further the centerline of the air spring 270 is from the centerline of the vehicle axle 202, the higher the mechanical advantage, resulting either lower air spring pressures or increased lifting/load carrying capacity.

FIG. 8A shows a perspective view of suspension assembly 210*a* mounted to frame rail 30 and vehicle axle 202, and suspension assembly 210*b*, which is a mirror image of suspension assembly 210a, mounted to vehicle frame rail 31 and vehicle axle 202. FIG. 8B shows the suspension assembly 210a and suspension assembly 210b shown in FIG. 8A with frame rails 30 and 31 removed. Suspension assembly 210b includes a frame hanger 275 that includes a frame attachment portion 276a and a frame attachment portion 276b that include a plurality of holes that may be used to mount the frame hanger 275 to frame rail 31.

A first control arm 288 is attached to frame hanger 275 and is also attached to an upper axle attachment member positioned about vehicle axle 202. Second control arm 278 is attached to frame hanger 275 and is also attached to a lower axle attachment member positioned about vehicle axle 202. First control arm 288 is shown extending horizontally from frame hanger 275 (but not required to be horizontal), and second control arm 278 extends at an angle from a centerline of first control arm 288 so that first control arm 288 and second control arm 278 are not parallel. An air spring 340 is attached to vehicle frame rail 31. In addition, a shock absorber (not shown) is also mounted to vehicle frame rail 31.

As noted above with suspension assembly 10a, calculations, computer simulations, and experimental data indicate that for truck suspensions using typical axle housings where the distance X (the lateral distance between the control arms) typically falls between 38" and 42", the optimum virtual center will lie between 35" and 50". The specific dimension A (or B) would be developed based on lateral spacing of the control arms and required roll stiffness for a given vehicle application. However, the optimum virtual center will lie between about 83% to about 131% of the lateral distance X between the centerlines of the control arms. In a preferred embodiment the virtual center will lie between 95% to 105% of the lateral distance X between the centerlines of the control arms.

In FIGS. 8A and 8B, a transverse rod 310 includes a first end 310a that is mounted to an inboard side of vehicle frame rail 30 and transverse rod 310 extends laterally (transverse to the frame rails 30 and 31) towards vehicle frame rail 31 above vehicle axle 202. The second end 310b of transverse rod 310 is mounted to a bracket on vehicle axle 202. The use of the transverse rod 310 provides additional lateral stiffness and auxiliary roll stiffness to the suspension assembly, but in some applications may not be required. As noted above, in a tandem axle configuration, a second transverse rode extending from the opposite side of the vehicle may be used to provide symmetry and additional roll stability.

The lateral or transverse distance between the control rods on opposing ends of the vehicle axle 202 will affect the degree of axle twist and hence the roll stiffness developed. In this embodiment, the control rods are mounted outside the vehicle frame rails 30 and 31 where the upper control rods (218 and 288) are spaced at a distance equivalent to the lower control rods (208 and 278). This spacing could be altered in order to change the torsional resistance to axle twist and therefore the roll stiffness developed. However, in this embodiment auxiliary roll stiffness is developed based on the spacing of the control arms outboard of the vehicle frame rails 30 and 31 and their attachment to the vehicle axle 202.

The positioning of the air springs 270 and 340 on the opposite side of the vehicle axle 202 from the control rods means that the upper rods are in tension, and the lower rods are in compression. The force vector along the lower rod enables a downward force to act through the clamp group or axle attachment members, thus reducing the load carried by the air springs 270 and 340. As a result, either a lower air spring pressure may be used, which may reduce fill time or allow a smaller (or lighter) air spring to be used, or a correspondingly greater axle load carried.

FIG. 9 is a side view of suspension assembly 210a shown in FIG. 5. A centerline 265 is shown extending within upper control arm 218. Because upper control arm 218 is a straight member, centerline 265 is contained within upper control arm 218. In addition, a centerline 263 is shown extending within lower control arm 208, and because lower control arm 208 is a straight member, centerline 263 is contained within lower control arm 208. If the control arms were curved to any significant degree, then a centerline extending from one end to the other would not be contained within the control arm.

Upper control arm 218 is shown extending horizontally from the frame hanger, whereas lower control arm 208 is shown extending at an angle alpha from the upper control arm 218. The non-parallel configuration of the upper and lower control arms 208 and 218 results in a configuration where a theoretical extension of these linkages develops a "virtual center" of rotation where the extended centerlines of the control arms intersect. In particular, in FIG. 9, centerline 265 of upper control arm 218 and centerline 263 of lower control arm 208 are extended beyond the ends of those control arms where they intersect at a virtual center of rotation 269. In this embodiment, the virtual center of rotation 269 is positioned at a distance B from the centerline of the vehicle axle 202.

The distance B is a function of the angular relationship between the upper and lower control arms and can be increased or decreased by changing the orientation of either the upper control arm or the lower control arm. The virtual center length may be optimized when combined with the axle torsional stiffness to generate a desired level of roll stability. The linkage arrangement of the control arms or the "linkage kinematics" will force a torsional axle input during a roll maneuver. The length of the virtual center (distance B) will govern the amount of axle twist. The axle's resistance to twist is the mechanism that will develop the auxiliary roll stiffness.

As noted above, calculations, computer simulations, and experimental data indicate that for tandem axle truck suspensions where the axles are spaced between 52" and 55" the optimum virtual center will lie between 40" and 50" from the axle centerline. The specific dimension B would be developed based on axle spacing and required roll stiffness for a given vehicle application. However, the optimum virtual center will lie between about 77% to about 91% of the distance between the centerlines of the vehicle axles.

In the trailing configuration of suspension 210a, frame hanger 205 is mounted to frame rail 30 forward of the vehicle axle 202. The same trailing configuration could be used on another vehicle axle to provide a trailing/trailing configuration. If suspension assembly 210a were used in a trailing/trailing configuration, the suspension would be torque reactive. However, a benefit of using such a trailing/trailing configuration is that inter axle load transfer is eliminated.

Example embodiments have been described above. Those skilled in the art will understand that changes and modifications may be made to the described embodiments without departing from the true scope and spirit of the present invention, which is defined by the claims.

We claim:
1. A suspension assembly for supporting a longitudinally extending vehicle frame rail, comprising:
  a frame hanger having a frame attachment portion adapted for mounting to the vehicle frame rail;
  an axle attachment member mounted to an end of a first vehicle axle;

a first control arm having a first end mounted to, and extending from, a first frame hanger boss positioned on the frame hanger, and a second end mounted to the axle attachment member;

a second control arm having a first end mounted to a second frame hanger boss positioned on the frame hanger, and a second end mounted to the axle attachment member;

wherein the second control arm extends from a centerline of the first control arm at an angle alpha so that the first control arm and the second control arm are not parallel to each other;

wherein the angle alpha is from about 9 degrees to about 23 degrees;

wherein the first control arm has a centerline that extends from the first end of the first control arm to the second end of the first control arm;

wherein the second control arm has a centerline that extends from the first end of the second control arm to the second end of the second control arm;

wherein the centerline of the first control arm and the centerline of the second control arm extend to intersect at a point that is at a virtual center of rotation;

wherein the frame hanger is positioned between the virtual center of rotation and the axle member;

wherein the virtual center of rotation is located from about 35 inches to about 50 inches from the centerline of the first vehicle axle;

wherein a centerline of the first vehicle axle is positioned at a distance D from a centerline of a second vehicle axle, and the virtual center of rotation is positioned at a distance that is 77% to 91% of distance D from the first axle; and wherein a distance between the second end of the first control rod and the second end of the second control rod where they are mounted to the axle attachment member is greater than a distance between the first end of the first control rod and the first end of the second control rod where they are mounted to the first and second frame hanger bosses positioned on the frame hanger.

2. The suspension assembly of claim 1, wherein the first control arm has a cross section that is the same as a cross section of the second control arm.

3. The suspension assembly of claim 1, wherein the angle alpha is from about 16 to about 20 degrees.

4. The suspension assembly of claim 1, wherein the virtual center of rotation is located from about 38 inches to about 42 inches from the centerline of the first vehicle axle.

5. The suspension assembly of claim 3, further including a transverse rod having a first end attached to the inboard side of the vehicle frame rail and a second end attached to the first vehicle axle at a position inboard from the vehicle frame rail.

6. The suspension assembly of claim 1, wherein a suspension assembly configured in the same manner as set forth in claim 1 is mounted to a second frame rail on the opposite side of the vehicle, with a spacing having a distance X measured between the centerlines of the control rods on opposite sides of the suspension.

7. The suspension assembly of claim 6, wherein virtual center of rotation is positioned at a distance from the centerline of the first vehicle axle that is 83% to 131% of lateral distance X.

8. The suspension assembly of claim 7, wherein the virtual center of rotation is positioned at a distance from the centerline of the first vehicle axle that is from about 95% to about 110% of lateral distance X.

9. The suspension assembly of claim 7, wherein the lateral distance X is from about 38 to about 42 inches.

10. The suspension assembly of claim 8, wherein the lateral distance X is between about 38 and about 42 inches.

11. The suspension assembly of claim 1, wherein the first control arm and the second control arm are in a plane that is parallel to a plane containing a centerline of the vehicle.

12. The suspension assembly of claim 1, wherein the centerline of the first vehicle axle is positioned a distance D that is about 52 inches to about 55 inches from a centerline of a second vehicle axle.

13. The suspension assembly of claim 1, wherein a spring mount extends from the axle attachment member on an opposite side of the axle attachment member than the first and second control arms.

14. The suspension assembly of claim 13, wherein an air spring is positioned atop the spring mount and attached to the vehicle frame rail.

15. The suspension assembly of claim 14, wherein a shock absorber is positioned atop the spring mount and attached to the vehicle frame rail.

16. The suspension assembly of claim 5, wherein the suspension assembly is non-reactive to braking and driving axle torque.

17. The suspension assembly of claim 16, wherein a roll oversteer gradient in the first vehicle axle will be the balanced by a roll understeer gradient developed in the second vehicle axle.

18. The suspension assembly of claim 17, where a lateral offset on the conical deflection of a lower control arm bushing about the vertical (Z) axis results in a conical moment (MZ) being developed in the lower control arm bushing and reacted through the bending stiffness of the lower control arm.

* * * * *